US008214264B2

(12) United States Patent
Kasavin et al.

(10) Patent No.: US 8,214,264 B2
(45) Date of Patent: Jul. 3, 2012

(54) SYSTEM AND METHOD FOR AN ELECTRONIC PRODUCT ADVISOR

(75) Inventors: Greg Kasavin, Mill Valley, CA (US); Scott Bedard, San Francisco, CA (US); Patrick Cashman Andrus, San Francisco, CA (US)

(73) Assignee: CBS Interactive, Inc., San Francisco, CA (US)

( * ) Notice: Subject to any disclaimer, the term of this patent is extended or adjusted under 35 U.S.C. 154(b) by 1508 days.

(21) Appl. No.: 11/415,416

(22) Filed: May 2, 2006

(65) Prior Publication Data

US 2006/0282304 A1    Dec. 14, 2006

Related U.S. Application Data

(60) Provisional application No. 60/676,280, filed on May 2, 2005.

(51) Int. Cl.
    *G06Q 30/00* (2012.01)
(52) U.S. Cl. ............ 705/26.7; 705/7.29; 705/7.31; 705/7.33; 705/14.4; 705/14.49; 705/14.53; 705/26.1
(58) Field of Classification Search ............ 705/10, 705/26, 27
    See application file for complete search history.

(56) References Cited

U.S. PATENT DOCUMENTS

| | | | |
|---|---|---|---|
| 4,996,642 A * | 2/1991 | Hey | ............... 705/27 |
| 5,367,627 A | 11/1994 | Johnson | |
| 5,410,344 A | 4/1995 | Graves et al. | |
| 5,446,891 A | 8/1995 | Kaplan et al. | |
| 5,459,306 A | 10/1995 | Stein et al. | |
| 5,583,763 A * | 12/1996 | Atcheson et al. | ........... 1/1 |
| 5,615,342 A | 3/1997 | Johnson | |
| 5,704,017 A | 12/1997 | Heckerman et al. | |
| 5,724,567 A | 3/1998 | Rose et al. | |
| 5,740,549 A | 4/1998 | Reilly et al. | |
| 5,749,081 A | 5/1998 | Whiteis | |
| 5,867,799 A | 2/1999 | Lang et al. | |

(Continued)

FOREIGN PATENT DOCUMENTS

WO    WO 9802835    1/1998

OTHER PUBLICATIONS

Linden, Greg, Brent Smith, and Jeremy York. "Amazon.com Recommendations; Item-to-Item Collaborative Filtering," Industry Report, IEEE Computer Society, (Jan. 2003), p. 76.*

(Continued)

*Primary Examiner* — Elizabeth Rosen
(74) *Attorney, Agent, or Firm* — Kacvinsky Daisak, PLLC

(57) ABSTRACT

A system and method operates on a client device and acquires a suspect list of user products based on information derived from the client device. The system normalizes the list, and the user confirms the accuracy of the product list. The user product list is sent to a server where the user product list is compared to other lists using collaborative filtering techniques. The collaborative filtering techniques determine products of interest for the use and the level of interest of the user. The system computes a similarity measure based upon the number of similar products that match the user's product list and rankings provided by the user and others. Demographic and behavioral data may also be used in performing the comparison and the similarity measure. The system acquires editorial rankings of products from other users and provides a ranked list of recommended products based upon the editorial rankings.

22 Claims, 12 Drawing Sheets

U.S. PATENT DOCUMENTS

| | | | |
|---|---|---|---|
| 5,884,282 A | | 3/1999 | Robinson |
| 5,974,396 A | | 10/1999 | Anderson et al. |
| 6,041,311 A | | 3/2000 | Chislenko et al. |
| 6,049,777 A | * | 4/2000 | Sheena et al. ............... 705/7.32 |
| 6,064,980 A | | 5/2000 | Jacobi et al. |
| 6,092,049 A | * | 7/2000 | Chislenko et al. .......... 705/7.29 |
| 6,108,493 A | | 8/2000 | Miller et al. |
| 6,112,186 A | * | 8/2000 | Bergh et al. ................. 705/7.32 |
| 6,195,657 B1 | | 2/2001 | Rucker et al. |
| 6,199,076 B1 | | 3/2001 | Logan et al. |
| 6,236,975 B1 | | 5/2001 | Boe et al. |
| 6,266,649 B1 | | 7/2001 | Linden et al. |
| 6,317,722 B1 | | 11/2001 | Jacobi et al. |
| 6,321,179 B1 | | 11/2001 | Glance et al. |
| 6,327,574 B1 | | 12/2001 | Kramer et al. |
| 6,330,592 B1 | | 12/2001 | Makuch et al. |
| 6,374,290 B1 | | 4/2002 | Scharber et al. |
| 6,412,012 B1 | | 6/2002 | Bieganski et al. |
| 6,438,579 B1 | | 8/2002 | Hosken |
| 6,449,632 B1 | | 9/2002 | David et al. |
| 6,487,539 B1 | * | 11/2002 | Aggarwal et al. .......... 705/14.23 |
| 6,544,042 B2 | | 4/2003 | Lippman |
| 6,606,619 B2 | | 8/2003 | Ortega et al. |
| 6,606,624 B1 | | 8/2003 | Goldberg |
| 6,615,208 B1 | | 9/2003 | Behrens et al. |
| 6,636,836 B1 | | 10/2003 | Pyo |
| 6,655,963 B1 | | 12/2003 | Horvitz et al. |
| 6,662,215 B1 | | 12/2003 | Moskowitz et al. |
| 6,698,020 B1 | | 2/2004 | Zigmond et al. |
| 6,701,362 B1 | | 3/2004 | Subramonian et al. |
| 6,748,395 B1 | | 6/2004 | Picker et al. |
| 6,757,661 B1 | | 6/2004 | Blaser et al. |
| 6,782,370 B1 | * | 8/2004 | Stack ........................... 705/7.29 |
| 6,801,909 B2 | | 10/2004 | Delgado et al. |
| 6,804,675 B1 | | 10/2004 | Knight et al. |
| 6,853,982 B2 | | 2/2005 | Smith et al. |
| 6,865,546 B1 | * | 3/2005 | Song ............................. 705/26 |
| 6,871,186 B1 | | 3/2005 | Tuzhilin et al. |
| 6,912,505 B2 | | 6/2005 | Linden et al. |
| 7,136,829 B2 | | 11/2006 | Hellal et al. |
| 7,373,319 B2 | | 5/2008 | Kopelman et al. |
| 7,403,910 B1 | * | 7/2008 | Hastings et al. ............. 705/26.1 |
| 7,613,629 B2 | | 11/2009 | Antonucci et al. |
| 2001/0025253 A1 | | 9/2001 | Heintz et al. |
| 2002/0002483 A1 | | 1/2002 | Siegel et al. |
| 2002/0039722 A1 | | 4/2002 | Lippman |
| 2002/0045154 A1 | | 4/2002 | Wood et al. |
| 2002/0107853 A1 | | 8/2002 | Hofmann et al. |
| 2002/0130902 A1 | | 9/2002 | Shaouy et al. |
| 2002/0151327 A1 | | 10/2002 | Levitt |
| 2002/0178072 A1 | | 11/2002 | Gusler et al. |
| 2002/0198882 A1 | | 12/2002 | Linden et al. |
| 2002/0199194 A1 | | 12/2002 | Ali |
| 2003/0014759 A1 | | 1/2003 | Van Stam |
| 2003/0115102 A1 | | 6/2003 | Mothwurf |
| 2004/0054572 A1 | | 3/2004 | Oldale et al. |
| 2004/0230440 A1 | | 11/2004 | Malhotra |
| 2004/0254911 A1 | | 12/2004 | Grasso et al. |
| 2004/0254957 A1 | | 12/2004 | Hyotyniemi et al. |
| 2005/0004941 A1 | * | 1/2005 | Kalker et al. ................ 707/104.1 |
| 2005/0097138 A1 | | 5/2005 | Kaiser et al. |
| 2005/0234781 A1 | | 10/2005 | Morgenstern et al. |
| 2006/0059225 A1 | * | 3/2006 | Stonehocker et al. ........ 709/202 |

OTHER PUBLICATIONS

Cooke, Alan D. J., Harish Sujan, Mita Sujan, Barton A. Weitz. "Marketing the Unfamiliar: The Role of Context and Item-Specific Information in Electronic Agent Recommendations." Journal of Marketing Research, (Nov. 2002), p. 488.*

Menczer, Filippo et al., "Adaptive Assistants for Customized E-Shopping," *IEEE Intelligent Systems*, vol. 17, No. 6. Nov./Dec. 2002, pp. 12-19.

Shardanand, Upendra and Pattie Maes., "Social Information Filtering: Algorithms for Automating 'Word of Mouth'," *Proceedings of ACM Conference on Human Factors in Computing Systems* (CHI'95), vol. 1, pp. 210-217.

* cited by examiner

Thanks for Electing to Review [Game Title]

Instructions: All fields are required. Please fill out the fields for Difficulty, Learning Curve, and Time Spent Playing; rate the game on our sliding scale; write a review summary; and submit a full review of at least 100 words in length. When writing your review, please remember to keep your language clean and focus exclusively on your personal impressions of [game title].

531 → Difficulty: [Select an Option ▼]

533 → Learning Curve: [Select an Option ▼]

535 → Time Spent Playing: [Select an Option ▼]

7.0
good

⊙ ◁ ⊕

Top Community Reviewers

| KarlB | Ashur | username |
|---|---|---|
| Small icon | ∧ ∧ — | Small icon |
| (10 Trusters) | | (# Trusters) |

See All Top Reviewers

537 → Review Summary (30 words or less):

Note [appears only when editing]: By editing your review, you will reset any positive ratings earned from the review.

Forums-style WYSIWIG editor

[Note: If any of the drop-down fields, the review summary, or the review body sections are left blank when the user hits the "submit" button, the page should refresh with the sections left blank indicated in red, like the "Review Summary" example above. The same applies if the user does not follow instructions, e.g. submits a review that's too short or laced with profanity.]

FIGURE 5C

SYSTEM AND METHOD FOR AN ELECTRONIC PRODUCT ADVISOR

FIELD OF THE INVENTION

The present invention relates to collaborative filtering systems that produce personal recommendations by determining the similarity between a user and others. More particularly, it relates to systems and methods for providing product recommendations based upon user preferences and the preferences of users with similar characteristics. The recommended products include retail goods and services as well as electronic products such as games, computer programs, music files, and the like.

BACKGROUND OF THE INVENTION

In recent years, networks and interconnectivity of individuals, groups, and organizations has dramatically increased. The Internet connects the world by joining billions of connected users that represent various entities, information, and resources. These connected users form enormous banks of resources, resulting in a world wide web of users. The users store and access documents or web pages, identified by uniform resource locators (URL), that can be accessed by other connected nodes on the network. This vast data store allows previously obscure or unknown information to be disseminated throughout the world. The users perform a wide range of activities such as accessing information sources including news, weather, sports, and financial sites. Other users buy and sell products and services in electronic commerce systems.

One of the primary applications of the Web has been shopping, that is, the purchase of goods and services. Virtually every major commercial "brick and mortar" merchant has established a Web site for the showcase and sale of their products. Further, many manufacturers sell products directly over the Web. Finally, a plethora of on-line merchants, not previously existing in the brick and mortar world, have come into existence. As a result, virtually every product is available for purchase over the Web from a plurality of merchants. This situation has increased the efficiency of markets by permitting shoppers to readily compare products and terms of sale from plural merchants without the need to physically travel to the merchant locations.

With this increase in efficiency of markets has come an increased burden on the consumer of these products. To determine the best quality, lowest price product now requires a consumer to sift through volumes and volumes of potential providers. To reduce the number of irrelevant product providers and to increase the quality of a consumer's search, information regarding potential providers may be filtered to deliver the most relevant providers to the user.

Information filtering is performed in a number of ways. For example, a customary consumer telephone directory of businesses, such as the Yellow Pages, filters product providers by geographic calling area. Further, Internet Service Providers and Internet portals also classify information by categorizing web pages by topics such as news, sports, entertainment, and the like. However, these broad subject areas are not always sufficient to locate information of interest to a consumer.

More sophisticated techniques for filtering products of interest to consumers may be employed by identifying information about the user. These methods may monitor and record a consumer's purchase behavior or other patterns of behavior. Information may be collected by means of surveys, questionnaires, opinion polls, and the like. These conventional techniques may be extrapolated to the networked world by means of inferential tracking programs, cookies, and other techniques designed to obtain consumer information with minimal consumer effort and minimal expenditure of resources.

Information may be transferred and stored on a consumer's computer by a web server to monitor and record information related to a user's web-related activities. The user's web-related information may include information about product browsing, product selections, and purchases made by the user at web pages hosted by a web server. The information stored by the inferential tracking programs is typically accessed and used by the web server when the particular server or web page is again accessed by the user computer. Cookies may be used by web servers to identify users, to instruct the server to send a customized version of the requested web page to the client computer, to submit account information for the user, and so forth. Explicit and implicit user information collection techniques are used by a large number of web-based providers of goods and services including eBay®, Amazon™, and others. In some instances, user information gathered by the servers is used to create personalized profiles for the users. The customized profiles are then used to summarize the user's activities at one or more web pages associated with the server.

Current shopping advisory systems focus on enhanced shopping carts to provide suggested additional products a user may purchase, while others have developed advisory systems to provide product recommendations based in part on a vendor payment to sort the vendor's product to the top of the list.

Conventional shopping advisory systems focus on a point of sale event and only take into account a user's imminent product purchase and possibly prior purchases from the specific merchant. These prior systems do not cover all related products a user acquired from a variety of sources.

Further, these conventional systems do not utilize user profile information based on collected demographics, user ratings, and behavioral data. Without this profile data, conventional systems do not provide personalized product information.

Finally, conventional systems typically do not incorporate unbiased professional editorial product reviews and ratings or end-user product reviews and ratings. Because they lack this editorial data, the typical advisory systems do not factor editorial rankings into the purchase advice.

Filtering methods based upon the content of the user's activities may be used to reach information, goods, and services for the user based upon correlations between the user's activities and the items. The filtering methods and customized profiles may then be used to recommend or suggest additional information, goods, and services in which the user may be interested.

Filtering methods serve to organize the array of information, goods, and services to assist the user by presenting materials that the user is more likely to be interested in, or by directing the user to materials that the user may find useful. Filtering attempts to sift through the vast stores of information while detecting and uncovering less conspicuous information that may be of interest to the user. The filtering methods attempt to locate items of meaningful information that would otherwise be obscured by the volume of irrelevant information vying for the attention of the user.

Information filtering may be directed to content-based filtering where keywords or key articles are examined and semantic and syntactic information are used to determine a user's interests. Additionally, expert systems may be utilized to "learn" a user's behavior patterns. For example, expert systems or intelligent software agents may note a user's actions in response to a variety of stimuli and then respond in the same manner when similar stimuli present in the future.

As expert systems grow, or as intelligent software agents expand to cover additional users or groups, the range and accuracy of the responses may be refined to increase the efficiency of the system. Collaboration among users or groups of like users results in increased accuracy with regard to predicting future user responses based upon past responses. Evaluating feedback of other similar users is effective in determining how a similar user will respond to similar stimuli. Users that agreed in the past will likely agree in the future. These collaborative filtering methods may use weighted averaging techniques for user feedback that extracts ratings for articles such as information, goods, services, and the like, to predict whether an article is relevant to a particular user. With weighted averages, however, the character of the content is ignored or otherwise obscured during the averaging process because personal preferences, credibility, and other factors are lost.

What is needed is a system and a method of combining user profile information with collaborative and editorial data to provide users with credible information regarding information, goods, and services.

SUMMARY OF THE INVENTION

The present invention relates to a system and method of combining user profile information with collaborative and editorial data to provide users with credible information regarding information, goods, and services. The system and method may incorporate collaborative filtering and profiling measures to provide recommended products and to provide a forum in which users with similar characteristics and interests may communicate further.

A preferred embodiment of the present invention programmatically acquires a suspect list of items that a user already owns or desires to own, which the user then confirms and adds relevant ratings, demographic, and behavioral data. This data is then compared to a database of product lists and ratings from similar users. A similarity measure is computed for each product list based on the number of similar products contained on the list that match the consumer's list, rankings, behavioral, and demographic data. A ranked list of recommended products that the consumer does not own is then computed based on the similarity measure and the editorial ratings of the product. The invention then causes the ranked list to be displayed to the consumer. The ranked list may then be modified based on additional variables.

BRIEF DESCRIPTION OF THE DRAWINGS

The accompanying drawings illustrate an embodiment of the invention and depict the above-mentioned and other features of this invention and the manner of attaining them. In the drawings:

FIGS. 5A-5C illustrate examples of the Community Review pages served by a system and method in accordance with the present invention.

DETAILED DESCRIPTION OF THE INVENTION

The following detailed description of the invention refers to the accompanying drawings and to certain preferred embodiments, but the detailed description of the invention does not limit the invention. The scope of the invention is defined by the appended claims and equivalents as it will be apparent to those of skill in the art that various features, variations, and modifications can be included or excluded based upon the requirements of a particular use.

The present invention extends the functionality of current collaborative filtering techniques to provide an advisory method combining user profiling based on demographic and behavioral data with collaborative and user and editorial rating data to provide a ranked list of recommended products. The present invention provides a ranked list of recommended "products" but is intended to cover additional items such as games, music, computer programs, and other goods and services that may exist in a less-tangible form than a concrete product. One of ordinary skill in the art would understand that the term "product" should also be extended to encompass these other goods and services as well. For brevity, the term "product" as used in conjunction with the present invention should be understood to cover these other items and other similar goods and services as well.

The system and method of the present invention has many advantages over prior systems because the product advisor results are tailored to a particular user based on demographic and behavioral data with collaborative, user, and editorial rating data to reduce irrelevant results. The present invention may be customized for individual users to return topically relevant products and lists to significantly reduce the overall locating times and processing resources required while providing improved relevancy, consistency, and reliability in delivering pertinent results.

Figure 1:
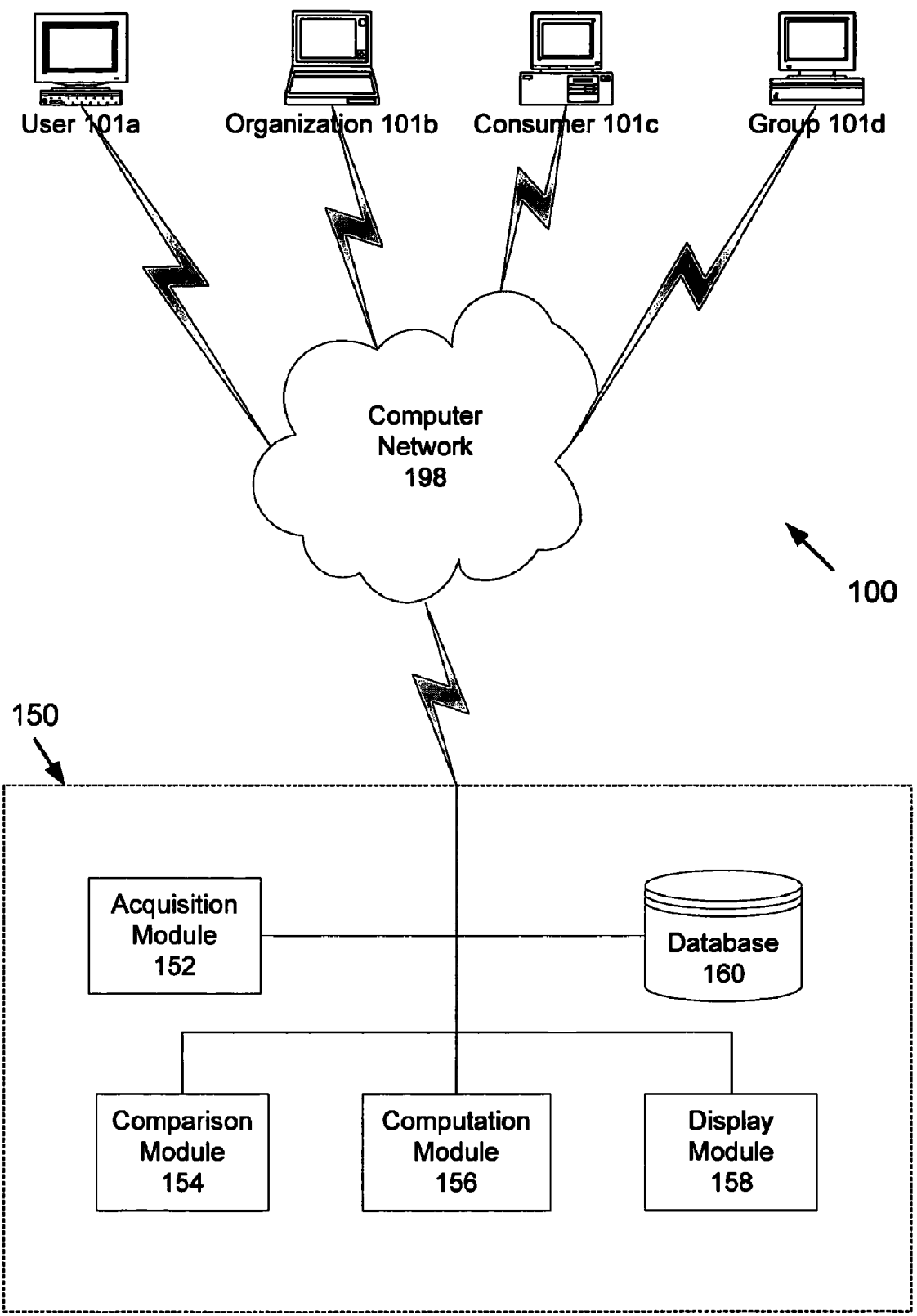
FIG. 1 illustrates an exemplary computer network in accordance with an embodiment of the present invention.

FIG. 1 illustrates an exemplary computer system in which concepts and methods consistent with the present invention may be performed.

As shown in FIG. 1, system 100 comprises a number of users 101a, 101b, 101c, 101d from which a suspect list of user products may be acquired. Users 101a, 101b, 101c, 101d may be individuals, groups, clients, servers, and the like. Users 101a, 101b, 101c, 101d may access an advisor server performing the method of the present invention, such as advisor server 150 comprising an acquisition module 152, comparison module 154, computation module 156, and display module 158 with which to access a database 160 of products. For clarity and brevity, four users 101a, 101b, 101c, 101d are shown, but it should be understood that any number of users may use the system 100 with which to access recommended products in a database 160. Database 160 may also be a network of databases as well, connected to advisor server 150 or accessible by advisor server 150. Likewise, it should also be understood that any number of advisor servers may be used by the system. Multiple advisor servers may be segregated by geographic location, by the type or number of recommended products that they offer, or by any number of criteria commonly used to configure server farms, web farms, or otherwise distribute computing resources and workloads between multiple computers and multiple modules.

For clarity and brevity, a single advisor server 150 comprising acquisition module 152, comparison module 154, computation module 156, display module 158, and database 160 is shown. It should also be understood that users 101a, 101b, 101c, 101d and advisor server 150 may be substituted for one another. That is, any user 101a, 101b, 101c, 101d may access recommended products housed and stored by another user. Advisor server 150 is illustrated as component modules 152, 154, 156, 158, 160 merely to show a preferred embodiment and a preferred configuration. The recommended product lists can be in a distributed environment, such as servers on the World Wide Web.

Users 101a, 101b, 101c, 101d may access advisor server 150 through any computer network 198 including the Internet, telecommunications networks in any suitable form, local area networks, wide area networks, wireless communications networks, cellular communications networks, G3 communications networks, Public Switched Telephone Networks (PSTNs), Packet Data Networks (PDNs), intranets, or any combination of these networks or any group of two or more computers linked together with the ability to communicate with each other.

As illustrated in FIG. 1, computer network 198 may be the Internet where users 101a, 101b, 101c, 101d are nodes on the network as is advisor server 150. Users 101a, 101b, 101c, 101d and advisor server 150 may be any suitable device capable of providing a document to another device. For example these devices may be any suitable servers, workstations, PCs, laptop computers, PDAs, Internet appliances, handheld devices, cellular telephones, wireless devices, other devices, and the like, capable of performing the processes of the exemplary embodiments of FIGS. 1-6. The devices and subsystems of the exemplary embodiments of FIGS. 1-6 can communicate with each other using any suitable protocol and can be implemented using one or more programmed computer systems or devices. In general, these devices may be any type of computing platform connected to a network and interacting with application programs.

Likewise, while component modules 152, 154, 156, 158, 160 are illustrated in FIG. 1 as being in advisor server 150, these component modules 152, 154, 156, 158, 160 may also be separate computing devices on computer network 198.

The computer component modules 152, 154, 156, 158, 160 are discussed below in greater detail and with reference to the process flow diagrams FIGS. 3A, 3B, 3C, 3D.

Acquire

In step 302, acquisition module 152 acquires a suspect list of user products such as a list of consumer electronics devices maintained in user's computer 101a, a list of mp3 files stored in a group's computer 101d, a list of computer games stored on an organization's server 101b, or a list of relevant information located on consumer's computer 101c. Similarly, the system and method of the present invention may acquire a suspect list of user products from any electronic device of the consumer, such as a portable digital assistant (PDA), a handset, a smart phone, a cellular phone, and the like. The suspect list of user products may be acquired in a number of ways. For example, the acquisition module 152 may initiate a system scan of the user's computer 101a, 101b, 101c, 101d to examine a user's files or programs. This system scan may be performed with or without the user's knowledge or permission, depending upon the circumstances of the scan and the anticipated type of products expected to reside on the users' computers 101a, 101b, 101c, 101d. For example, when attempting to access a suspect list of computer game program files, acquisition module 152 may initiate a system scan of user computer 101a after requesting permission of the operator of user computer 101a.

Conversely, acquisition module 152 may commence a system scan of an organization's computer 101b at a predetermined interval to examine computer files, game programs, and the like. This type of system scan may have a user's tacit knowledge as a condition of his or her participation in the advisor server environment. In any event, the acquisition module 152 initiates a system scan to acquire a suspect list of user products.

Likewise, acquisition module 152 may also collect information from a user 101a, 101b, 101c, 101d as the user searches a web site or other network location for products. The browsed products may then be added to the suspect list. For example, a user 101a, 101b, 101c, 101d may be shopping for a particular computer game and store a title or description of a suspect game to a user's collection. Acquisition module 152 may collect information regarding the products from the user's collection, shopping carts, or other interim holding and listing mechanism.

Also, acquisition module 152 may track web site usage or network usage and add suspect products to a list. For example, a user may view a particular product web page. Acquisition module 152 may then acquire product information from the visited web pages and add suspect products to the user's suspect product list based upon the type of web page. Additionally, acquisition module 152 may acquire suspect product information by analyzing a web site or network location and importing the information from a web page itself. For example, a web page, a collection of web pages, or a document located on a visited network location may be parsed to generate a list of commonly-occurring terms, product information, or suspect products, and the suspect products may be added to the suspect product list. The forgoing examples are illustrations only, and other suitable techniques may be used to acquire a suspect list of user products and to update an existing suspect list of user products within the present invention.

Normalize

Regardless of the manner in which acquisition module 152 acquires a suspect list of user products, after the list is acquired in step 302, in step 304 it is normalized or matched to a standardized product list that is maintained on the Advisor Server 150.

The normalization process is optional and may be performed before, during, or after the suspect list of user products is updated. The normalization process serves to provide a measure of standardization when different users refer to the same product. This standardization promotes searching and reporting efficiencies within the system by reducing the number of database queries required.

Confirm

After the suspect list of user products is normalized to a product list on the product advisor server, in step 306 the system prompts the user to confirm the status of the products listed. That is, the user acknowledges that the normalized or standardized naming of the suspect product is in line with the user's understanding of the suspect product and that the normalized name accurately describes the product.

Product List Categorization

After the user acknowledges that the normalized list of suspect products is an accurate representation of the products, in step 308 the user begins to separate the products that he already owns from the products that he would like to own. If the user already owns the product, in step 310 the user adds the product to an Owned Products List. In step 312 the user ranks the product on the Owned Products List. If the user does not already own the product, but decides in step 314 that he would like to own the item, the product is added to a Wish List in step 316. In step 318, the user ranks the product on the Wish List. If, in step 314, the user determines that they do not wish to own the suspect product, the product listing is discarded and the process stops in step 399.

Send Lists

In step 320, the user can send their Owned Product List or Wish List to the Advisor Server, to another user, or to a Group.

Sent to Advisor Server

If the user sends their list to the Advisor Server, in step 322 the invention acquires product lists from other users from a database of product lists. These other acquired lists will serve as a basis of comparison with which the user's product list may be evaluated.

The invention checks to see if the user is registered in step 324, and if the user is registered, additional demographic data from a database of demographic data is also acquired in step 326. Additionally, behavioral data from a behavioral data database is acquired in step 328. These demographic and behavioral data may be stored in database 160 or any database otherwise accessible by advisor server 150. For registered users, these additional demographic and behavioral data supplement the product lists acquired in step 322. The additional demographic and behavioral data form the basis for additional comparisons with the user product lists and product lists acquired from other users. If a user is not registered, optional registration means may be provided to enable the user to subscribe to the system.

Once the product list from other users and any demographic data and behavioral data is acquired, the user confirms the product list is accurate in step 330. The user may edit the product list by adding, deleting, or modifying the product list to ensure it is accurate.

Compare Lists Using Similarity Measurement

After the user confirms that the product list is accurate, in step 332 the comparison module 154 compares the user's owned product list, wish list, demographic and behavioral data (if applicable), and rankings with lists acquired from other users from the database of product lists.

To conduct this comparison, in step 334, the computation module 156 computes a similarity percentage for each product list based on the number of similar products contained on the list that match the consumer's list, rankings, behavioral, and demographic data. A ranked list of recommended products the consumer does not own is then computed based on the product of the similarity percentage of a product list and the number of instances of un-owned products and the user and editorial ratings of the product. A ranked list of recommended products the consumer does not own is then made available to be displayed to the user. The user may further modify this list based on additional rankings. The following tables provide an illustration of this comparison method and the resultant recommended product list. Other comparison methods based on known techniques, including Boolean and frequency weighting, clustering, and Bayesian approaches, and various collaborative filtering techniques, may also be employed.

In Table 1, below, X represents that a particular letter user owns a particular numbered product.

TABLE 1

|  | Product 1 | Product 2 | Product 3 | Product 4 | Product 5 |
|---|---|---|---|---|---|
| User A (consumer) | X |  | X |  |  |
| User B |  | X |  |  | X |
| User C |  | X |  |  | X |
| User D |  |  | X | X | X |
| User E | X | X | X |  |  |
| User F | X |  | X | X |  |

Based upon which products are owned by both User A and by a different user, a similarity percentage is determined. The similarity percentage is calculated by determining the number of products that a particular letter user has in common with User A (consumer). The similarity percentages are shown below in Table 2.

TABLE 2

|  | Similarity Percentage | Explanation |
|---|---|---|
| User A (consumer) | N/A | User A is the basis of the comparison. |
| User B | 0% | User B owns products 2 and 5, while User A owns products 1 and 3. User B owns 0 of 2 products that User A owns. Therefore, the similarity percentage is 0%. |
| User C | 0% | User C owns products 2 and 5, while User A owns products 1 and 3. User C owns 0 of 2 products that User A owns. Therefore, the similarity percentage is 0%. |
| User D | 50% | User D owns products 3, 4, and 5, while User A owns products 1 and 3. User D owns 1 of 2 products that User A owns. Therefore, the similarity percentage is 50%. |
| User E | 100% | User E owns products 1, 2, and 3, while User A owns products 1 and 3. User E owns 2 of 2 products that User A owns. Therefore, the similarity percentage is 100%. |
| User F | 100% | User F owns products 1, 3, and 4, while User A owns items 1 and 3. User F owns 2 of 2 products that User A owns. Therefore, the similarity percentage is 100%. |

To compute a ranked list of recommended products the consumer does not own, the product of the similarity percentage of a product list and the number of instances of un-owned products is calculated. That is: (Similarity percent)×(number of instances of un-owned product). In the current example, the multiplication products are calculated for products 2, 4 and 5. They are not calculated for products 1 and 3, because User A already owns products 1 and 3. Table 3 below illustrates this calculation.

TABLE 3

|  | Product 1 | Product 2 | Product 3 | Product 4 | Product 5 |
| --- | --- | --- | --- | --- | --- |
| User A (consumer) | N/A | N/A | N/A | N/A | N/A |
| User B | N/A | (0%) × 1 = 0 | N/A | (0%) × 0 = 0 | (0%) × 1 = 0 |
| User C | N/A | (0%) × 1 = 0 | N/A | (0%) × 0 = 0 | (0%) × 1 = 0 |
| User D | N/A | (50%) × 0 = 0 | N/A | (50%) × 1 = .5 | (50%) × 1 = .5 |
| User E | N/A | (100%) × 1 = 1.00 | N/A | (100%) × 0 = 0 | (100%) × 0 = 0 |
| User F | N/A | (100%) × 0 = 0 | N/A | (100%) × 1 = 1.00 | (100%) × 0 = 0 |
| Sum | N/A | 0 + 0 + 0 + 1.00 + 0 = 1.00 | N/A | 0 + 0 + .5 + 0 + 1.00 = 1.50 | 0 + 0 + .5 + 0 + 0 = .5 |

The sum is computed merely by adding the multiplication product for each user for each numbered product as shown in Table 3. Once the sums are computed for each numbered product, the un-owned products are ranked according to the largest sum. In the example above, the recommended product list is sorted by rank as:

Rank:
1. Product 4 (sum is 1.50)
2. Product 2 (sum is 1.00)
3. Product 5 (sum is 0.5)

After the similarity measure is computed, the acquisition module 152 acquires editorial rankings of the products in step 336. The editorial rankings for the products serve as another mechanism with which to sort the recommended products. The system provides incentives to users to capture user product data, editorial rankings, and user ratings. By encouraging users to participate in the ranking process by providing credits and other valuable items, a source of rating data is available. The ratings are then used to provide recommended products such as games, music, and the like, to other users. Similarly, with software files and downloads, a list of the applications a user has is acquired, and the list is compared with a database of other user lists and ratings, and a ranked list of new software applications or downloads that the user may like is returned. With consumer electronics and technology products, the system compares what a user has against a database of similar users and recommends other electronic products. Regardless of the source of the editorial rankings and the type of product ranked, in step 338 the ranked list of products may be sorted by editorial rankings and presented for display by display module 158.

Figure 2:
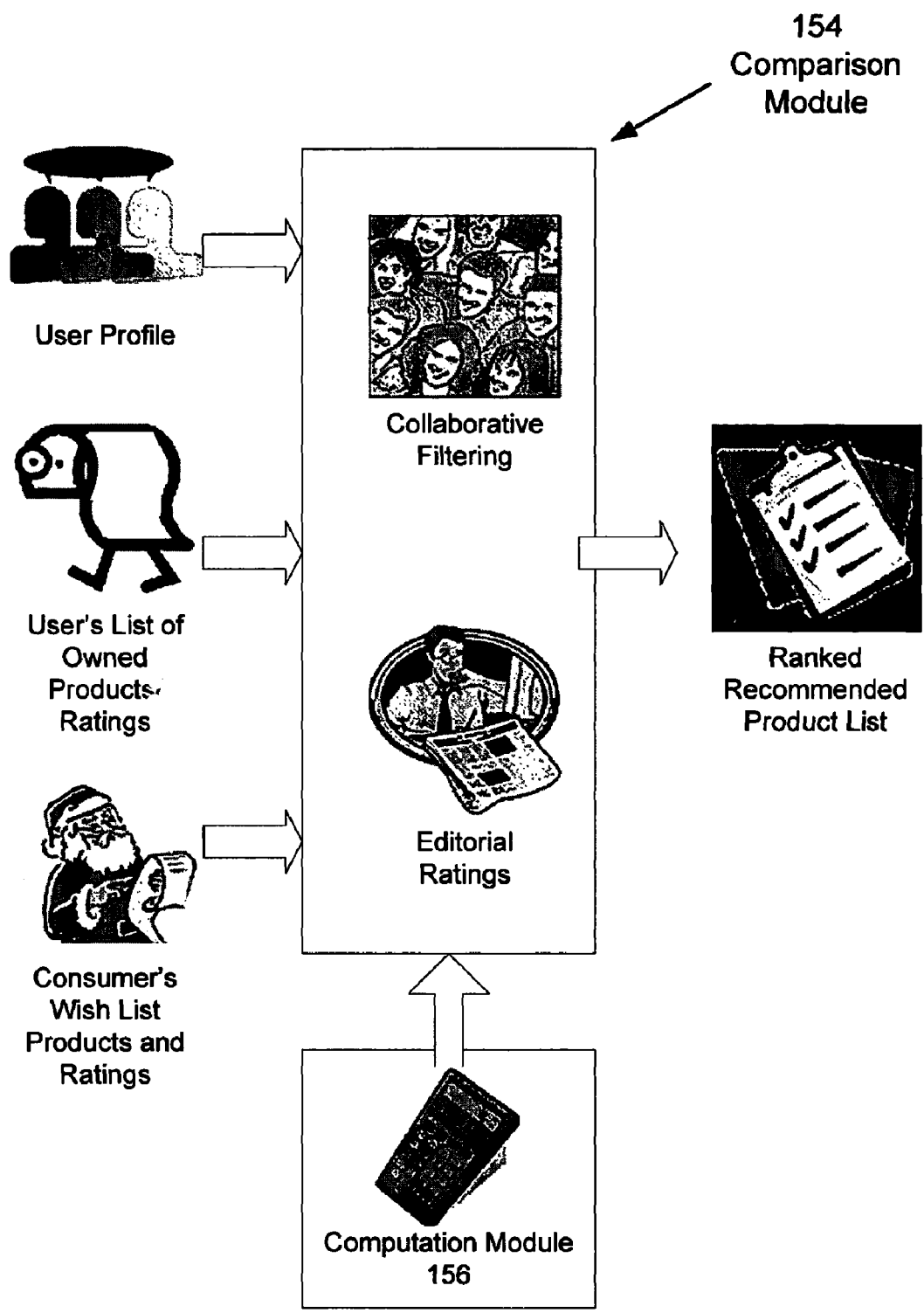
FIG. 2 illustrates an exemplary comparison module in accordance with the present invention.

As further illustrated in FIG. 2, comparison module 154 receives input data including user profile information, user product lists and ratings, and user wish lists and ratings. Comparison module 154 works with computation module 156 to employ collaborative filtering techniques and editorial ratings to output a ranked recommended product list.

Upon presentation for display by the display module 158, the user now has a ranked recommended product list. To facilitate further action by the user, such as to purchase recommended products or locate additional information regarding the recommended products, in step 340 a mechanism and forum is provided in which the user may access additional documents related to the products, may communicate with other users, and may otherwise investigate the listed products and other related products.

Sent to Other Users

Figure 3A:
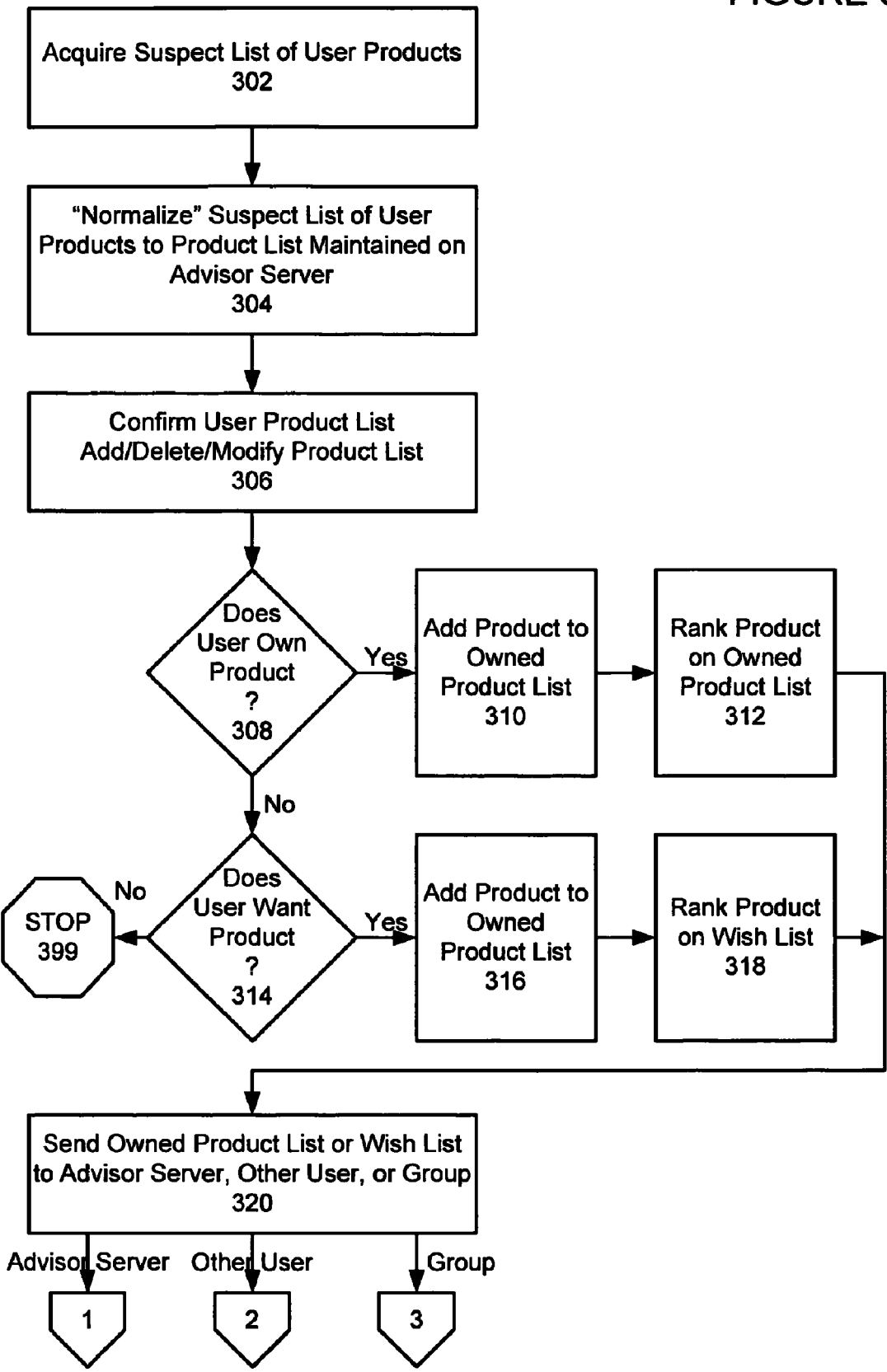
FIGS. 3A-3D show a flow chart illustrating methods in accordance with the present invention for presenting a ranked recommended product list to a user.
Figure 3B:
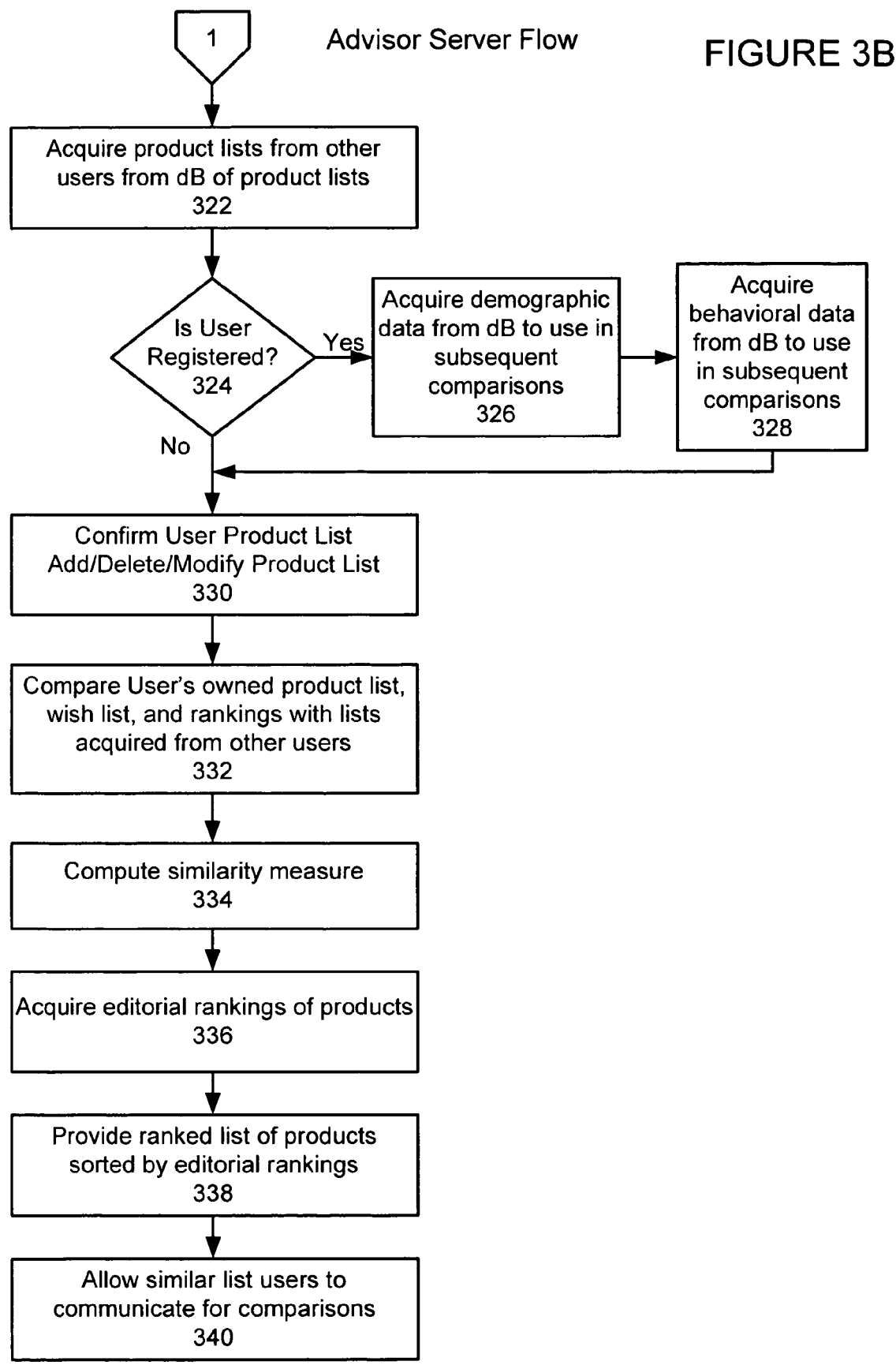
Figure 3C:
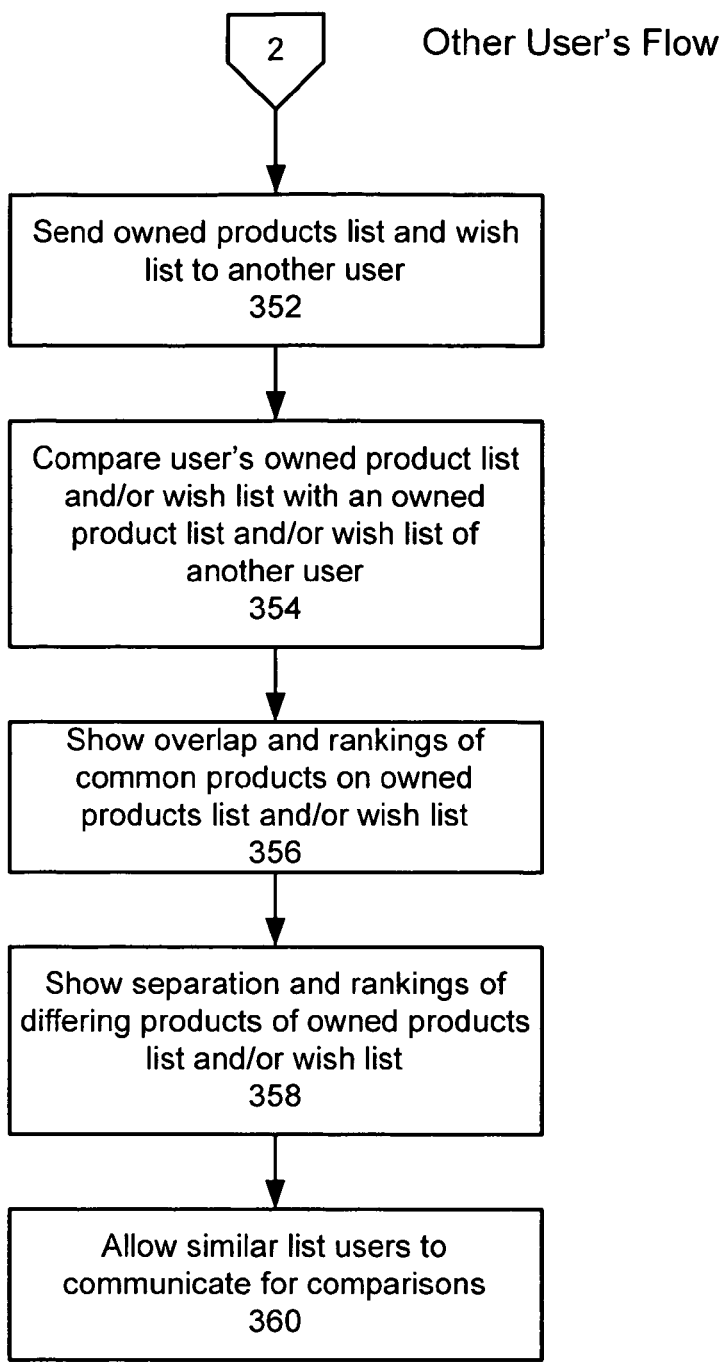

As shown in FIG. 3C, in step 352, if the user sends their list to other users, the acquisition module 152 acquires the other user's lists. In step 354, comparison module 154 compares the user's owned product list or the user's wish list with an owned product list or wish list of another user. In step 356, the computation module 156 computes the overlap and rankings of products common to both the user's list and the other users to whom the user's list was sent. Display module 158 then presents these common products to the user. In step 358, the computation module 156 computes the separation and rankings of differing products in both the user's list and the other users to whom the user's list was sent. Display module 158 then makes available to the user the ranked list of these differing products.

Upon presentation for display by the display module 158, the user now has a ranked recommended product list. To facilitate further action by the user, such as to purchase recommended products or locate additional information regarding the recommended products, in step 360 a mechanism and forum is provided in which the user may access additional documents related to the products, may communicate with other users, and may otherwise investigate the listed products and other related products.

Sent to Groups

Figure 3D:
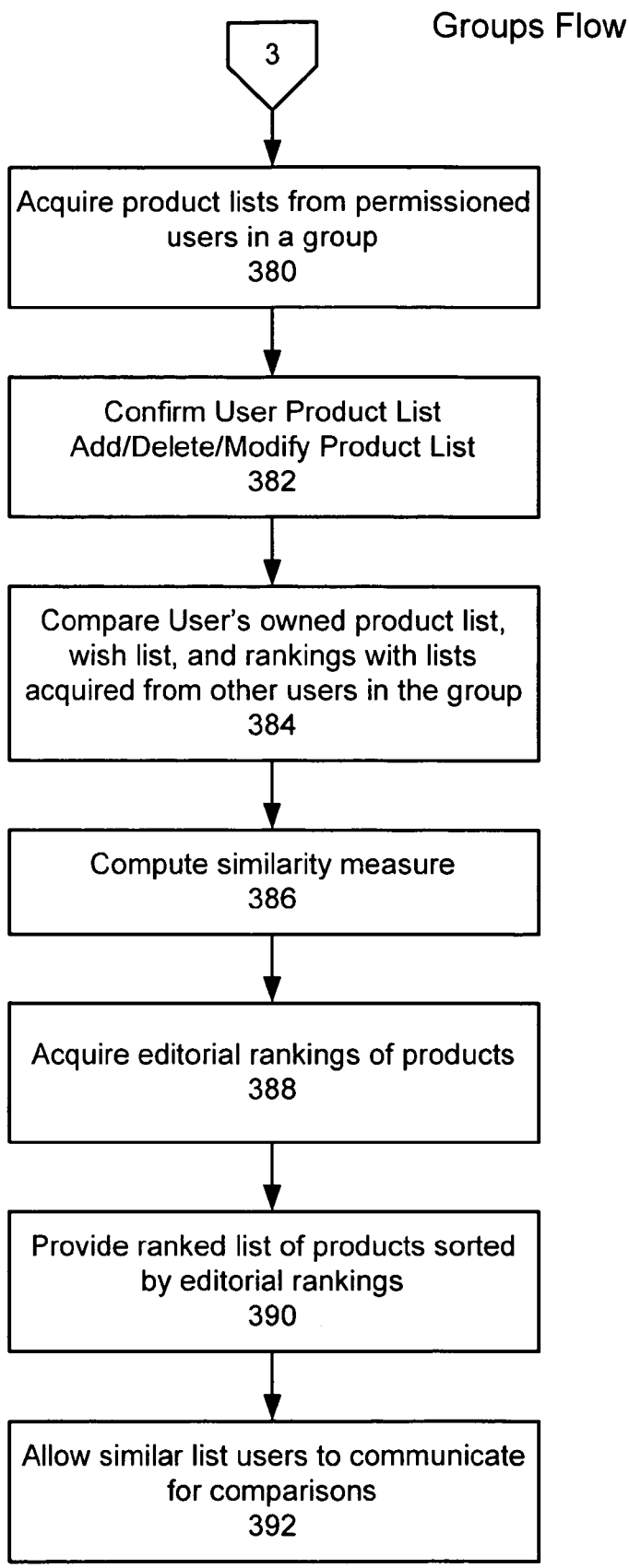

As shown in FIG. 3D, in step 380, if the user sends their list to a Group, the acquisition module 152, comparison module 154, computation module 156, and display module 158 carry out the method of the invention in a similar fashion as described above with regard to the case where a user sends the products lists to the advisor server 150. When sending the product lists to the groups in step 380, the acquisition module acquires product lists from permissioned users in the Group, rather than from an entire database of users as in the Advisor Server flow previously discussed. In this fashion, the system acquires a smaller, but likely more targeted set of product lists with which to compare to the user's lists. If a user is not registered or otherwise has permission to access the group of interest, optional registration means may be provided to enable the user to subscribe to the system.

As above, once the product list from group users is acquired, the user confirms the product list is accurate in step 382. The user may edit the product list by adding, deleting, or modifying the product list to ensure it is accurate. After the user confirms that the product list is accurate, in step 384 the comparison module 154 compares the user's owned product list, wish list, and rankings with lists acquired from the group.

In step 386, the computation module 156 computes the similarity measure as described above. Once the similarity measure is computed, acquisition module 152 acquires editorial rankings of products on the lists in step 388, and the computation module 156 computes the rankings of the products. Display module 158 then makes available to the user the ranked list of products sorted by editorial rankings in step 390.

Upon presentation for display by the display module 158, the user now has a ranked recommended product list. To facilitate further action by the user, such as to purchase recommended products or locate additional information regarding the recommended products, in step 392 a mechanism and forum is provided in which the user may access additional documents related to the products, may communicate with other group members, and may otherwise investigate the listed products and other related products.

Regardless of the destination to which a user sends his owned product list or wish list, the ranked recommended list of products that the user receives as an output from the present invention opens innumerable doors through which the user may enter.

Implementations—User Preferences

For example, if the list of "products" that a user submitted was directed to favorite computer games, a ranked recommended list of computer games may be output and displayed to the user after completion of the above method of the present invention. Similarly, when a user submits a list of web sites, a ranked recommended list of web sites is presented to the user. Drilling down further into this example, the parsing mechanism of the present invention, as executed by the acquisition module 152, may acquire configuration information related to the user's favorite web sites, or specifically the user's favorite computer game web sites. This configuration information may be presented in steps 340, 360, and 392, respectively, depending upon the particular product lists acquired for comparison, to allow a user to create and customize a personal web site on a computer game home page (also referred to herein as "GameSpot"). In this fashion, a user may configure and personalize their favorite game site using their own preferences. While the below examples are directed to a "product" that is a computer game, these examples are merely illustrative of the system and methods of the present invention, and any "product" as discussed above, may be used.

A. User-Preference Set-Up

A user may set up a "My Games & Preferences" page that personalizes features of a game or a game's web site for a particular user. The "My Games & Preferences" page offers a suite of unique, useful, and entertaining features designed to heavily engage the user with the game system, or the game itself, as well as provide additional game site usage and user preference data. A user may access their personalized home page when logging onto a game web site, such as prior to playing the game, or at any time the user visits the web site.

For example, the web page, or the game's web page presents the user with a login box. As soon as the user logs in, a "My Games & Preferences" button is displayed. The user may choose to view the preferences or skip the preferences and proceed directly to playing the game. If the user chooses the preferences button, the user initially views a default personalized home page configured with colors, buttons, and style graphics based upon the user's product lists and the ranked recommended product list of configuration and graphics features present in the user's listed web sites. The personalized web page can be a unique page with its own unique URL, based on the registered user's username. If the user elects to make his page publicly visible, it can be surfaced from other user pages as part of their ranked recommended product lists. Similarly, a shortcut button may be added to the user's personalized home page to show other "GameSpotters with similar tastes" to cull other ideas for customizing the user's home page.

B. User Preference Features

Other features that are included in user's preferences include user's personal space, including bio and site usage, forum usage statistics, the user's most wanted games list, the user's tracked games list, the user's download and data streaming preferences, and additional buttons offering other functions such as shortcuts to a collection of games to play, to a web storefront where additional materials may be purchased, to a review section offering product reviews, to a ratings page where the user may rate games, products, and features, to a forum where users of similar interests communicate by trading messages, to a search utility, and to other information.

1. User Space

A user space includes biographical and site usage information and is based on and expanded out from a user account. The user space allows easy access to account management and preferences options on the home page, yet has the unique and fun user profile features typically found in forums. Other users can access each other's profiles, but other users cannot adjust or edit someone else's preferences or data.

A gateway link entitled "My Games & Preferences" takes users directly to their profile page. Also, wherever the user's username appears on the site (e.g., reader reviews, forum posts, etc.), the username can be hyperlinked to the user's profile page.

The user space includes a lot of information in a limited space. A tab structure can be employed to let the user skip over to other areas of the page as well. Further, since user space pages can optionally be visible to the public, the designs can look slightly different depending on whether a user is looking at his own page or is looking at someone else's page.

The following information is presented on the user space page including Username (e.g., KarlB_Darkplayer), GameSpot Rank (e.g., Level 5: Shyguy), Personal Icon, Member Since (Month/Year), Last Online (DD-MMM-YYYY), Currently Online (Yes/No), Emblems Earned, Real Name, Birth Date, Location (City, State/Province, Country), Email, AOL IM, Yahoo! IM, ICQ IM, MSN IM, Xbox Live Gamertag, and Personal Photo (or links to gallery of more photos). This information may be required or optionally-provided depending upon the circumstances and environment in which the user operates.

Additionally, group and community oriented information including Friends List, Invite a Friend (to sign up for Basic/Complete), GS Community Center, About Me (Biographical information), Signature (appears at the end of forum posts, reader reviews, etc.), and Private Inbox/Send User a Private Message designations may also be entered and displayed in the user space page. Further, Games and Systems information may also be shown, such as "Now Playing" list of games, My System Specs (e.g., via system scan plug-in or manually-selected list), My Game Collection, My Most Wanted Games, My Tracked Games, My Personal Game Store, and a link or name for My Personal Home Page.

a. Personalized Home Page

A user's personalized home page (My Personal Home Page) can be modeled on platform and GameSpot Live pages. Content can be surfaced based on the user's platform and game category preferences, and the content can be organized based on the user's habits on the site.

For example, the content types used most frequently on the site (news, reviews, previews, screens, movie streams, etc.) can be prioritized on the user's personalized home page. An embedded streaming video window can automatically appear on a user's personalized home page, and the playlist can be catered to that user's preferences. The GameSpot top story for the day can appear on this page, but need not be at the top. A most popular list based on the user's preferences can also be presented.

As the user accesses these other features of the personalized home page, the system of the present invention tracks the user's site usage. For example, if the user is a GameSpot user and this week looked at Halo 2 for the Xbox and Splinter Cell for the PC, this usage information is tracked so the system can automatically recommend similar platform and similar game category preferences based upon the collected data. Similarly, based on a user's preferences, a personalized game store may be configured and created by the acquisition module 152, comparison module 154, and display module 158 to surface links for the user's tracked games, top-rated games that fit their category and platform preferences, and the like.

Additionally, data related to Forums & Contributions may also be shown in the user space page including Most Visited Forums, My Forums, My Recent Forum Posts, Total Number of Forum Posts, My Reader Reviews, Total Number of Games Rated, Average Game Rating, and My Reader Review Showcase.

Further, the user may show preferences and administrative functions such as privacy settings (this page can be set as public (the default) or friends-only, or anonymous), download/streaming preferences, advertisements on/advertisements off, ice on/ice off, notification/newsletter status (email, instant messaging, RSS), Account management, and the like. The user preferences and account information is accessible only to the user (not available for public display). Other options can include transmission capabilities such as narrowband/broadband, screen resolution, rating system (numbers or letters), page skin/layout (choose from various themes), local video game stores, local music stores, and other local merchants and providers. Additionally, portable devices (for on-the-go delivery/consumption) are also listed. Enabling content consumption on a user's portable device, such as a mobile phone, is shown in detail in Appendix A.

b. User Demographic Information

User demographic information is collected and may be displayed or hidden depending upon the user's preferences. For example, a username and personal icon may be entered. The birth date, address, email address, and Internet Service Provider also help characterize and profile the user. Similarly, the date that the user began using the service, the date that the user profile was last updated, and additional demographic information serve to help identify and categorize the user to better provide content in which the user will be likely to have an interest.

c. User Behavioral Information

Additional behavioral information may be collected once the user begins accessing the site. For example, the games listed and tracked on the user's Most Wanted List are identified and tracked. Likewise, the user's most Visited Forums, Latest Forum Posts, Total Number of Forum Posts, Latest Reader Reviews, Number of Games Reviewed, Number of Games Rated, and Average Rating given are all totaled and stored with the user's behavioral data. Similarly, the user's Total Visits to GameSpot, Total Minutes on GameSpot, Average Number of Pages per Session, Average Number of Visits per Week, and Last Pages Visited on GameSpot all provide behavioral data with which the user may be characterized to better provide content in which the user will be likely to have an interest.

2. User Linking

In order to increase the number of ways that users can network with one another, the system of the present invention properly hooks users up with other users that have similar product tastes. For example, by compiling and analyzing the statistics discussed above, users may view lists of other users who share similar characteristics. A basic example is to let users view lists of users that claim to own any given game. Another example enables users to search for links to other users based on their collection, their now playing list, or other list-type criteria.

The present invention enables this search by providing a button on the profile page that says "Find Users Like Me." Clicking this button returns a list of users and percentages, sorted by the percentage. The percentage indicates how many of the games in the first user's collection are owned by the other users. The cut-off range for including users in this summary can be altered, for example, users with at least a 50% match can be included in these results, but that number can be adjustable in the event that 50% returns too many or too few matches.

The system of the present invention allows users to add games to any of their lists and get to the game-specific forum at the GameSpace level by using an add games button. This button for adding games also allows for a number of other features such as List removal, where once a user has a game on any of his lists, the user may stop tracking this game by activating the appropriate "stop tracking this game" button or further remove the game from the user's now playing list by activating the "remove this game from my now playing list."

Additional features available once the user adds a game to one of the user's lists include "XX GameSpot Users Own This Game" where the top of the message box lists how many GameSpot users own any given game. Clicking this link takes the user to a list of the users that have a game in their collection. A prominent link to the GameSpace is provided on this page as well. Similarly, a "XX GameSpot Users Are Now Playing This Game" message may be displayed as above, but with the Now Playing list.

An "Overall GameSpot Rank" may also be calculated based on the lists and displayed as "Currently Ranked XXX out of YYY Games". This feature extends the list of the top 10 most popular spaces all the way down the site and returns a numbered rank for every single space on the site.

a. Communities

Communities serve to unite users of similar interests and characteristics. Communities are social network services that enable similar users to meet, interact, and share knowledge and items of interest. Additionally, communities offer users the opportunity to earn rewards through active participation.

Figure 4A:
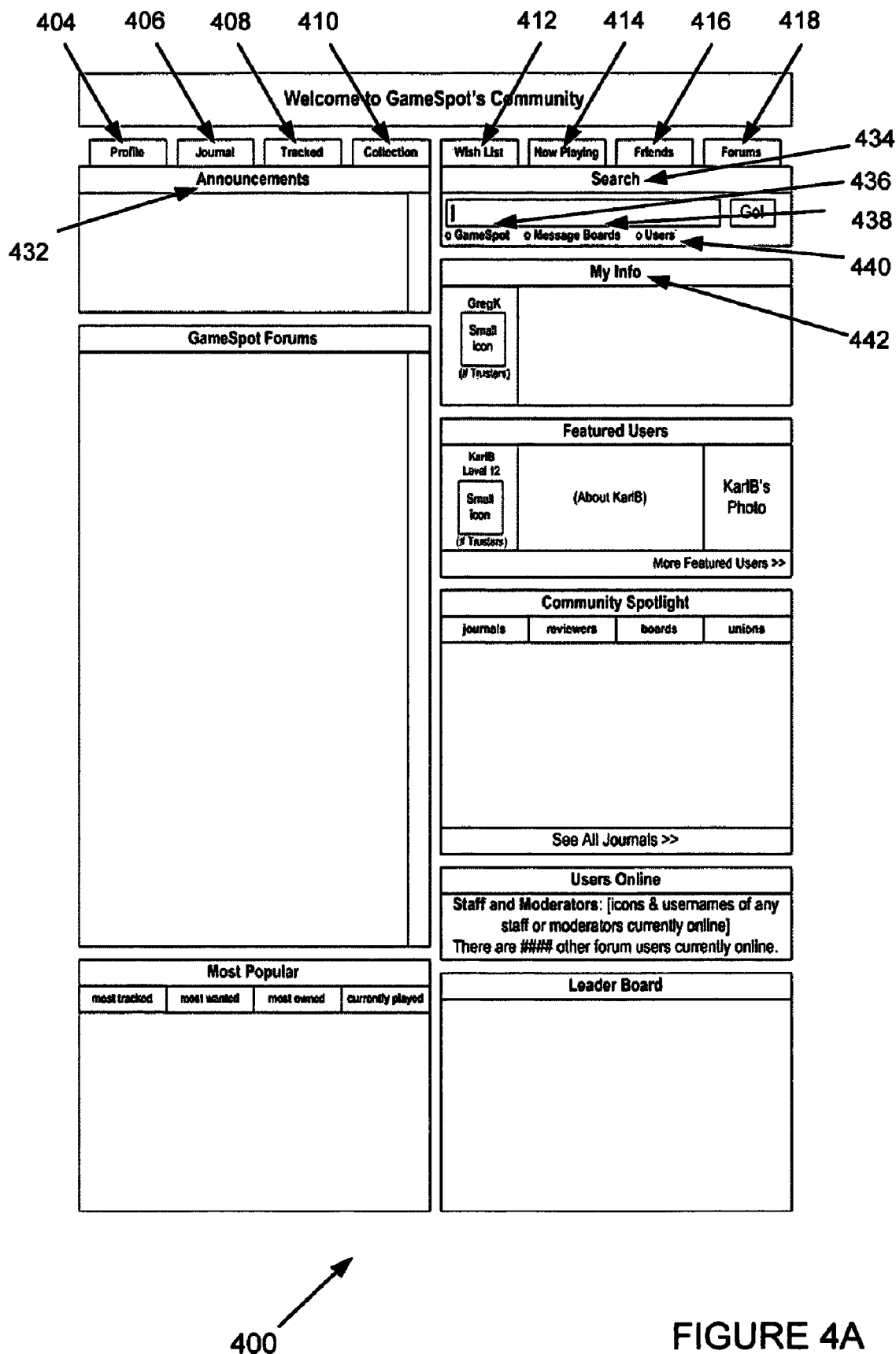
FIGS. 4A and 4B illustrate an example of a community page template and a screen shot of a community page, respectively.
Figure 4B:
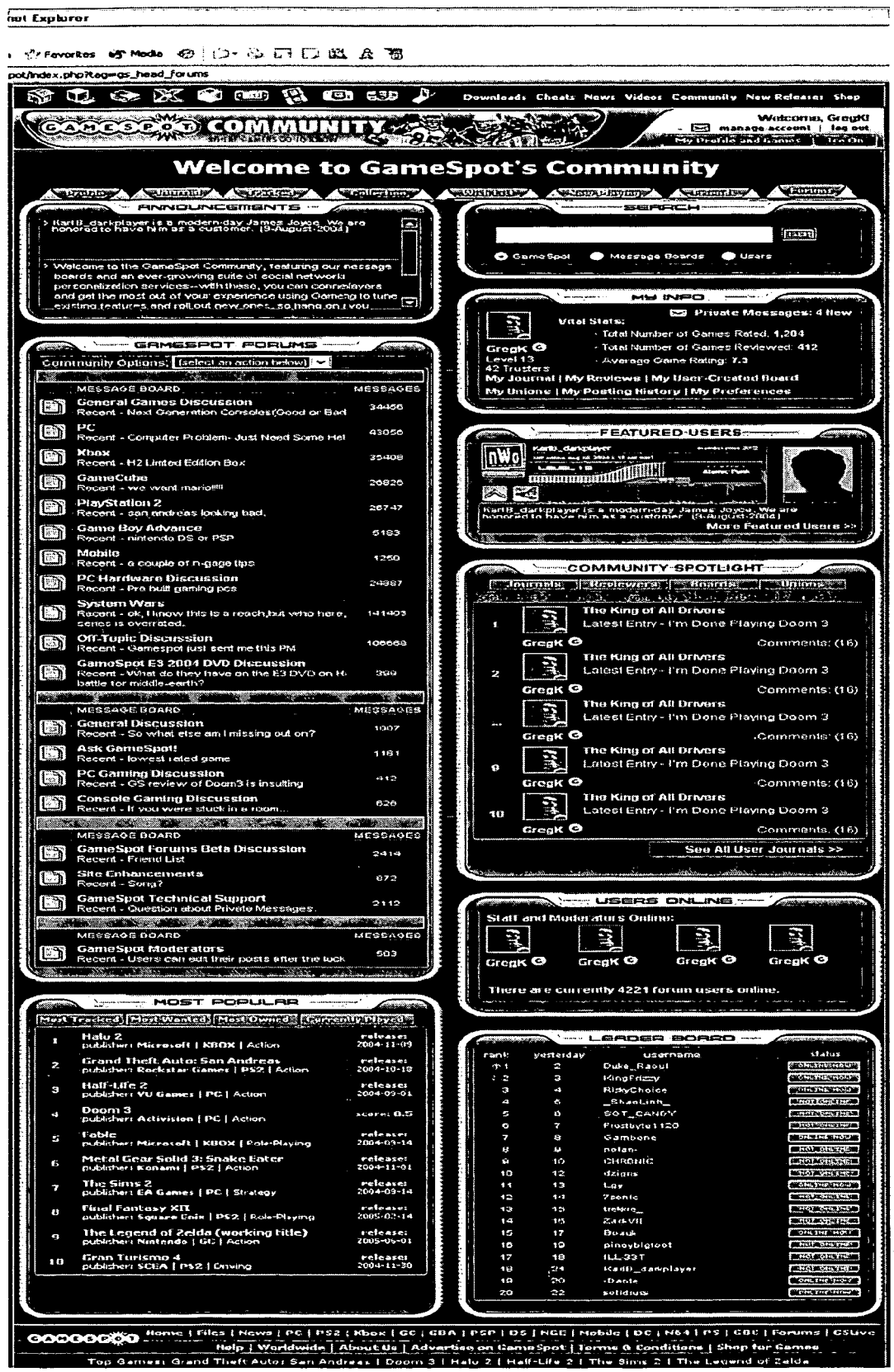

Communities allow users to create their own customizable profile page where they can pre-set levels of privacy and access to their personal information. From users' profile pages, user may connect with other users through specialized "unions" or "groups," send private messages, create friend lists, and visit forums where users can read posts by other users. Community pages are generated by display module 158 upon input from the other modules 152, 154, 156, 160 in advisor server 150. An example of a community page template is shown in FIG. 4A. This view of the community page is also known as the Community Front Door, because it is the entry point into the community of users. A screenshot of a community page served by advisor server 150 is illustrated in FIG. 4B.

As shown in FIG. 4A, a community page 400 may include sections tabbed as Tracked 408, Collection 410, Wish List 412, Now Playing 414, Friends 416, and Forums 418. These features of the communities within the system and methods of the present invention are characterized below.

1) Tracked 408—allows users to get instant updates on GameSpot or via email whenever there are any news updates on their favorite games, either from GameSpot itself or from more the 350 other game sites around the web;
2) Collection 410—where users can list all of the games they own and compare them to other GameSpot users and even get an estimated value on their game collection. Collections also allow users to easily rate and keep track of all of their games
3) Wish List 412—lets users pick the games they are hoping to buy in the future. During the holiday season, users' wish lists will be featured on the front page of GameSpot, enabling gift givers to easily select, and then instantly order games for participating friends and family;
4) Now Playing 414—allows users to define their "up to the minute" personal tastes and interests to other community members by listing their the games they are currently playing;
5) Friends 416—knowing that word of mouth is the best way to get game recommendations, the Friends page helps users reach each other for insights into popular games, send private messages, and even find potential online gaming opponents;
6) Forums 418—Forums are message boards for users to share their opinions and thoughts, exchange hints and cheats, and more. The system of the present invention includes a message board forum capable of handling more than 200,000 message posts per day. Forums are provided and linked to from sites located on the user's personalized home page. The forums may be a single, game-specific forum per game (irrespective of how many platforms the game is on; still just one forum), or more global topic forums, depending upon the user's preferences and usage history.
7) Journals 406—Additional features of the Community page 400 include Journal section 406. Journals give each user a personal soapbox and diary. Journals are intended to foster user loyalty and engagement with the sites and services produced by the system and method of the present invention, as well as a manner in which to foster community amongst users.

In addition to accessing journals from Community page 400 by Journal section 406, users can access their own journals from their user profile pages (for example, profile tab 404), and in turn, they can reach other users' journals from those users' profile pages. Additionally, user journals can be accessible from unique URLs that incorporate usernames. It can also be possible for users to use RSS to either feed in an existing journal into the present system or feed a journal out of the system.

Journals, as used in the system and methods of the present invention, are similar to flexiform threads, but have additional characteristics that provide added functionality. A journal is essentially a message board thread with write access limited to the specific owner of the journal (the user), and read access based on the user's profile setting (public, friends only, anonymous). Journal entries are essentially the same thing as message board posts, and can have the same properties—users can have access to a WYSIWIG editor for creating journal entries, and can then edit those entries using the existing tools. Journals can be paginated chronologically the same way message board threads already are. Journal entries should also have the same dropdown options as message board posts do, allowing readers to report abuse and so on.

Some of the additional characteristics of the journals of the present system that differ from flexiform threads include topic lines. Each journal entry can have a topic line, identical to when a user is creating a topic in a forum, as opposed to responding to a topic. Additionally, users can enable (default) or disable user comments on journal entries, which can be a new option in the user's preferences. The "Comments" system replaces the "Reply" and "Quote Reply" options found in GameSpot forum threads, and allows readers to respond to journal entries. Comments can be listed as follows: "Comments (#)", where # is the number of comments that have already been submitted, e.g., "Comments (5)". Clicking the comments link next to a journal entry is how you read comments about the journal entry and/or submit your own. Comments on journals can be added via a pop-up tool based on a Community Messenger. Comments are listed in chronological order in a simple text-based format with the comment itself, the author's username, and a timestamp for when the comment was posted. The comment submission field is at the end.

Individual journal comments optionally can have report-abuse options, as the report abuse option on the journal entries themselves can serve well enough for policing comments related to the journal entry. Journal entries need not have signatures. However, images and HTML are permitted. Users can extract their journals from their profile pages, or even import an existing journal into the system. An option to "Add a link to my journal to my sig" can also be employed.

When visiting another user's profile, the Journal tab 406 can be highlighted if the user has posted at least one journal entry. Also, the user may set an "Allow Comments/Do Not Allow Comments" parameter via radio buttons (default=comments on), which can be definable on a post-by-post basis.

Additionally, at the top of the page, the user is prompted to name his journal (as though creating a User Created Board), a parameter that can be save-able but also changeable at any time. By default, the system can name users' journals "[Username]'s Personal Journal". On a journal preferences page, this section indicates "Optional: Please describe yourself or describe what your journal's about. Your description will be displayed on your journal." If the user doesn't put anything in his description field, the description box simply need not appear on his journal pages.

Journal topics are grouped by date. In keeping with journal and blogging conventions, topics can be grouped by date (per the format in the design). So if a user posts two journal updates today, both updates are grouped under the heading of "Tuesday—Aug. 24, 2004". In turn, individual topics only get a timestamp. Times can be displayed as "4:36 pm", or as "4:36 PM". Timezones are selected based on the user's location preference, or selected from a list.

Also, journals are subject to the same terms of service and posting guidelines with regard to content restrictions as typical posts. Instead of a message saying, "When writing your message, remember to keep the language clean", the system can include the following instructional text, such as "This journal is for you to share or explore your thoughts about gaming or other topics. However, when writing your entries, please remember to keep the language clean" or the like.

When visiting one's own Journal tab 406 subsequent times, the view can be of the journal entries themselves—that is, the same view as other users would see, but would include an option to "Post New Journal Entry" (needs graphic) instead of the usual Post New Message. Further, journal authors can be allowed to comment on their own journal entries if desired and if they've enabled commenting. Users may delete their journal entries one at a time, and there can be an Are You Sure? prompt prior to deletion.

The journal can also be surfaced on the user's profile page, in the Personal Data section, below the About Me section—especially when looking at profiles for those users who have posted to their journals.

The format, when looking at the profile of someone who has previously posted a journal entry, is as follows in Table 4:

TABLE 4

| Format | Example |
|---|---|
| [Journal Name] | [GregK's Personal Journal] |
| [Latest Journal Entry Title] | [Revisiting Panzer Dragoon Orta] |
| Posted | [Jun 25, 2004 3:07 am GMT] |

The latest journal entry title is hyperlinked to the journal page.

If looking at the Community page 400 prior to posting a journal entry for the first time, there appears a "My Personal Journal" link underneath the "My User-Created Board." The User-Created Board link and the journal link can be temporary here, since this box is labeled "My Stats"—The system can fill it with stats and add another box called "My Forums" for these.)

8) Now Playing 414—Additional features of the Community page 400 include Now Playing section 414. The Now Playing tab 414 automatically lists the games in the user's Now Playing list. If the user has nothing on his Now Playing list, this tab section is grayed out. This box stretches vertically based on the total number of games in a user's Now Playing list.

9) Friends' Journals 416—This tab automatically surfaces the usernames or icons of up to eight friends—specifically, up to eight friends that have most recently updated their journals. So, even if I have 50 friends, whoever among them updated their journals most recently are going to be the friends who show up on my list. Users who set their journals to NOT be publicly viewable are automatically excluded from these lists.

Preferably, users who set their journals to "Friends Only" are displayed in these lists expressly to those who are their friends. For example, if Steve, Trey, and JSD are all friends, then they can see each other on their friends lists. Greg, who is friends only with Steve, couldn't see Trey's and JSD's journals from Steve's journal, however. Alternatively, the system may post an error message for users trying to access restricted journals. Generally, restricted journals have their tabs grayed out. If I visit your profile and you have a journal, but it's for friends only and I'm not your friend, then I see a grayed out journal tab.

Additional Community Features

The Community front door provides an entry point into pages in which like users meet and interact, but importantly the community of users provides the collaborative data with which the ranked list of recommended products is compiled. The community as an entity is formed by a series of new, personalized pages produced by the system and method of the present invention by the overarching "community" framework that exposes trends and accomplishments within the collection of users who opt to participate (also know as "GameSpot Community"). The community is concisely presented by way of personalized and customized options to the user, including existing download and media preferences and account settings, as well as additional settings.

The advisor server 150 provides a gateway hub from which users can access the individual components of their community pages as well as find other users' pages as well as see various interesting statistics about the community. These statistics include, for example, total number of members (i.e., number of basic and number of complete members can be surfaced), total number of members currently online, member of the week, (spotlighting a key member's profile and granting that member the top games on his wish list). Also, the most owned and most wanted games by platform is also displayed, based on users' game collections and most wanted lists. Additional community statistics compiled and displayed include the most popular forums and forum threads and a color-coded world map showing where GameSpot users are concentrated.

Announcements

As also shown in FIG. 4A, Announcements box 432 employs a User Interface so that the community manager can update it frequently. The User Interface is functionally similar to a journal User Interface, but the Announcements box 432 has the ability to float announcements (e.g., the "Terms of Service" announcement can always be on top). Also like journal entries, announcements carry a timestamp for context. For end users, there is also navigation capabilities at the bottom of the scroll box to flip through "previous >>" announcements.

Search

The search field 434 includes radio buttons beneath the search field 434 to allow the user to choose the destination for his search from GameSpot 436 (by default), Message Boards 438, and Users 440. These options can work intuitively; the default search is equivalent to initiating a search from the main GameSpot page.

My Info

The field labeled "My Stats" can have its name changed to My Info 442. The My Info box 442 can list the user's username and icon; however, the dimensions of the My Info box 442 can change to a wide-and-short rectangle; the username can appear directly above the avatar, with both left-justified in the box.

The middle of the My Info box 442 is an automatically-scrolling, automatically-wrapping statistics box with the heading "Vital Stats". Users can increase the speed of the scrolling by mousing over the box. The contents can include the following fields: Level, Percent to Next Level, Current Rank, Next Rank, Last Online, Most Visited Forum, Total Forum Posts, Total Messages Read, Total Number of Messages Edited, Total Time Online, Preferred Genre, Total Number of Games Rated, Total Number of Games Reviewed, Average Game Rating, Total Number of Private Messages Sent, Member Since, Community Ranking, Number of Thumbs Ups, Average Number of Visits Per Week, Total Number of Friends, Total Number of Threads Locked, Next Game on Wish List, Total Number of Tracked Games, Total Number of Games in Collection, Total Number of Games in Wish List, Total Number of Games Now Playing, Average Number of Pages Per Visit, Total Number of Private Messages Received, Estimated Value of Collection, Most Recent Emblem, Number of Trusters, Total Number of Threads Moderated, Most Pages Visited Per Session, Most Visited Content on GameSpot, and Total Visits to GameSpot.

The statistics are compiled based on the behavior of GameSpot visitors as they navigate the site, update their biographical information, provide ratings of products, share information, and interact in the community. These data are then used by the advisor server to return a ranked recommended list of products to users.

Community Reviews

Figure 5A:
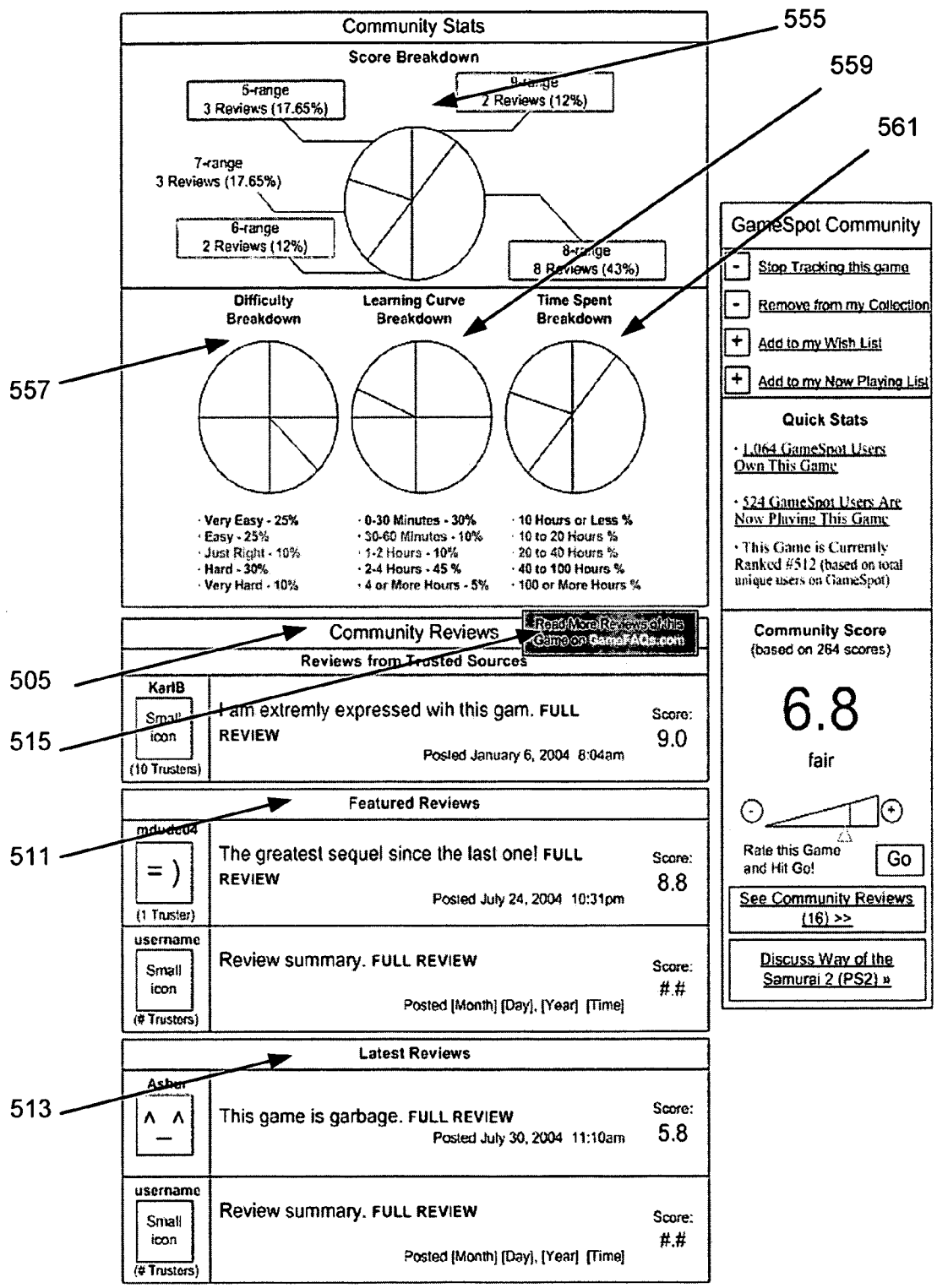
Figure 5B:

As illustrated in FIGS. 5A-5C, one method of providing guidance and recommendations to users is by way of reader reviews, or more broadly Community Reviews. Community Reviews provide insight and recommendations from users 507 to users regarding a variety of products. Registered users can submit reviews and review forum posts to include a button-based Thumbs Up/Thumbs Down voting system 509. Anonymous or unregistered users attempting to vote are taken to a basic sign-up page to register so that they may vote. Once a user has voted on a post or a review, a Thank You message appears instead of the vote prompt.

Users with the greatest number of Thumbs Up votes for either their posts or their reviews earn unique emblems respective to posts or reviews. Emblems are listed and described further in Appendix B. There are three levels of emblem: Top 100, Top 500, and Top 1,000. These emblems are mutually exclusive to each other. In addition to earning emblems on their profile pages, users to whom votes are cast also gain a symbol next to their username. These symbols say "top 100", and the like, depending upon the level. These symbols then follow the user and appear wherever these users post materials.

On a community review index page, 10 percent of the total reviews (rounded to the nearest whole number, e.g. if there are 15 reviews, then 10 percent=2 reviews) become "featured reviews". Featured reviews 511 are at the top of the page and gain that status from user voting; the review with the most Thumbs Up votes is the top review. Remaining reviews can appear in a "Latest Reviews" section 513 beneath the Featured Reviews 511. At the bottom of a community review, Featured Reviews 511 and up to three Latest Reviews 513 are listed. If the community review itself is one of the Featured Reviews 511 or one of the top three Latest Reviews 513, then the reference to it can be omitted from listings at the bottom.

A fairly prominent button entitled "Read More Reviews of this Game on GameFAQs.com" 515, can link to the respective reader review index page on GameFAQs. This button 515 appears on community review index pages as well as at the bottom of individual community reviews. Community reviews are functionally similar to message board posts. That is, the reviews can be administered, reported, or edited.

When a user elects to write a review (FIG. 5C), in addition to rating the game and writing the review, the user can fill in the following fields via drop-down menus 531, 533, 535:

Difficulty 531 (Very Easy, Easy, Just Right, Hard, Very Hard)

Learning Curve 533 (0 to 30 Minutes, 30 to 60 Minutes, 1 to 2 Hours, 2-4 Hours, 4 or More Hours)

Time Spent Playing 535, to Date (10 Hours or Less, 10 to 20 Hours, 20 to 40 Hours, 40 to 100 Hours, 100 or More Hours)

Additionally, a reviewer may be prompted by the system to enter a review summary 537, equivalent to the topic of a forum thread. The review summary 537 may then appear on review summary pages. The review summary is limited to 30 words. At the top of the review summary pages, there are four pie charts 555, 557, 559, 561, respectively displaying Score Breakdown (based on score ranges) 555, Difficulty Breakdown 557, Learning Curve Breakdown 559, and Time Spent Breakdown 561, based on stats from reader review submissions. The pie charts 555, 557, 559, 561 provide a quick summary to a user glancing at the review pages.

Community User Ratings

In order to facilitate further interaction within the community of users, and in order to refine ranked recommended product offerings, a reader rating system is used to evaluate and rate products. As shown in FIGS. 6A-6D, the community user ratings are a Flash-based unit, allowing the user to use a slider 606 to assign a score between 1.0 and 10 and then click "Go" 608 to lock in the score. The pluses 610 and minuses 612 on opposite sides of the sliding scale can increase the score in increments of 0.1. The community score 614 (i.e., average user rating) and corresponding one-word descriptor can change in real time as the user manipulates the sliding scale.

Figures 6A, 6B, 6C, 6D:
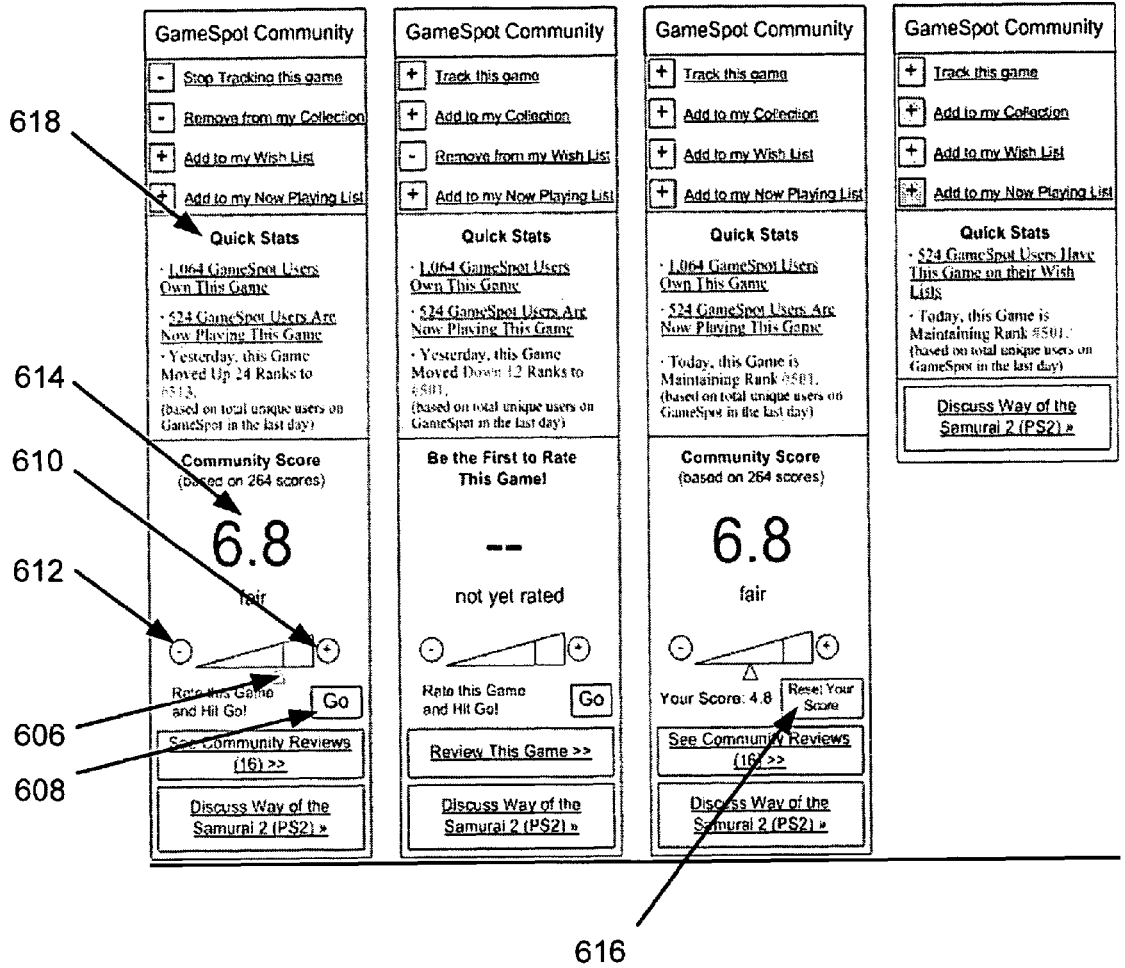
FIGS. 6A-6D illustrate examples of the Community User ratings pages served by a system and method in accordance with the present invention.

The pointer on the slider defaults to indicating the point on the scale that corresponds to the community score as shown in FIG. 6A (Example 1). If no one has rated a game yet, then the player score appears null, and the pointer on the slider defaults to the 7.0 "redline" on the scale as shown in FIG. 6B (Example 2). After a user has rated a game, his score is displayed beneath the sliding scale, and the "Go" button is replaced with a "Reset Your Score" button 616 as shown in FIG. 6C (Example 3). Clicking on the "Reset Your Score" button 616 omits the user's score from the database and reverts to an Example 1 (shown in FIG. 6A) treatment, as though the reviewer had not rated the game yet.

The system of the present invention allows the ability to surface a pop-up version of this flash unit (or some other, similar solution) elsewhere on the site—specifically, from a user's Collection pages, where they are invited to "Rate it!" for each game they own.

If a game has not yet been officially released (that is, the game's release date is in the future), the reader scoring system component does not appear and the Add to Collection and Now Playing options are unavailable as shown in FIG. 6D (Example 4). Further, if a user has not yet registered or is anonymous, the Add to Collection and Now Playing options are grayed out if a game's release date is in the future.

The system includes the ability to remove games from lists in the same way as they can be added, wherein minus graphics can replace the plus graphics in those cases as shown in FIGS. 6A and 6B (examples 1 and 2).

A "Quick Stats" section 618 illustrates community stats detailing community activity at the game level. For all games, an overall ranking can be assigned, ranging from the #1 game on down, based on total number of games in the system database as shown in FIGS. 6A-6D. The ranking also indicates the extent to which the ranking has changed recently, by noting how many (if any) ranks the game jumped up or down in the last day.

For games that are available, the system lists how many users have the games in their collections and in their now playing lists, as shown in FIGS. 6A-6C (examples 1, 2, and 3). These declarations can be hyperlinked to emblem-style lists of those users. The system can paginate such pages, to display, for example, 200 users at a time.

As shown in FIG. 6D, for games that are not yet available, the system can declare how many users have the particular game in their wish lists (but not tracked games lists). These declarations can also be hyperlinked to emblem-style lists of those users, paginated, and displayed as well.

My Game Collection and My Most Wanted (Games)

The Game Collection & Most Wanted page can offer GameSpot users a free, personalized service by which users can maintain a list of the games they own and want to own, and have automatic access to a number of unique features and statistics concerning their lists. The My Game Collection & My Most Wanted gives users the ability to easily build their game collection list and game wish list and to keep track of the games on those lists. The My Game Collection & My Most Wanted pages are publicly visible (by default), so users can exchange links to them for bragging rights, and can also readily access useful information about the games they own or plan to own. For example, the system of the present invention keeps track of statistics, and can feature an ongoing "Win your Most Wanted" contest to entice users into using the service.

An exemplary embodiment of the present invention includes a method in which users can build their game collections on GameSpot. In the My Games & Preferences page, another gateway link takes users directly to the "My Game Collection" section of the My Games & Preferences. This link and page surfaces a search box labeled, "Add Games to Your Collection." Search options, such as "Search by Title" and other criteria for sorting the search results are employed, such as community ratings, number of discussions in the forums, and the like. When the Search Results are displayed, an "I own this game, Add it to my collection" button is used to automatically add games that the user owns whose release date is less than or equal to today's date (i.e., the games are available). Alternatively, a button called "I want this game, Add it to my wish list" appears for games that the user would like to own. A small pop-up window is included to confirm the user's action. If a user has a game in his collection, neither button need appear, and the system shows a message button such as "You own this game" or "This game is on your wish list" depending upon the status of the game. Clicking any of that message text button takes the user to his collection page. If a user has a game in his wish list, and the game is available, the collection button appears. Adding a wish list game to a collection automatically removes the game from the user's wish list. To safeguard the lists, games may only be remove from a collection from the collection page.

Also, the system can also give users the option to import a collection list from another source, such as a web page or other network document. Users can plug in a URL or paste in a text document with a games list that the system can parse and interpret and use to add games to the respective lists.

For example, a user can select the "Import Your Game Collection from a Web Page", such as an IGN user page that they've already built, or a forum post they've created. The system queries the web page or document for game titles listed using delimited text, paragraph breaks, commas, spaces, tables, and the like. The system automatically adds the located game titles to a user's game collection. A one-step approval process occurs first, which allows the user to un-check any games that were improperly added (e.g., multiple versions of multiplatform games). The user then can continue to add games manually via additional searches.

As an alternate importing method allows users to enter the 12-digit UPC that appears with the bar code on the back of every retail game. UPC data is already being collected, but UPC data for multiple versions of a game can also be stored. For example, Halo for the Xbox was released in two editions—the software is identical, but the Game of the Year packaging has a different UPC than the original release. Additionally, the system can store UPC data for foreign versions of games.

Similarly, multiple versions of the same game may also be stored in the appropriate user list. For example, the Japanese version of a game is oftentimes different than its domestic release. In order to cater both to the importer market as well as foreign users, the system of the present invention allows users to select which version of a game they have. Someone who was a gaming devotee may have imported a game and then purchased its domestic counterpart. This user would want to show those differences and the multiple versions as part of their collection. Thus, two entries for the same game are possible, provided those entries refer to different versions of the game. If the UPC for the foreign release is not available, the system offers a "Can't find your game in our system? Contact us!" link on the collection page that enables a user to send an e-mail to the data group producing the system of the present invention. The system also solicits users for some of the missing data (e.g., foreign UPCs) at this point.

Users may also designate a subset of games in their collection as games they're "Now Playing." This list shows up at the top level of a user's public profile. Up to ten games may be designated as "now playing." The system of the present invention factors game rentals into this list as well.

Once the user builds a My Game Collection or a Most Wanted list, the user can customize the design of the My Game Collection page or the Most Wanted list page. For example, these pages can take the same basic design as for Search, because they can serve a similar purpose—to point the user to the system resources for those games, as well as to provide useful and interesting at-a-glance information about each game. The system allows the user to customize the fields that appear on the page by turning on or off a check-boxed row of possible data types. Displayed columns can be shifted left or right. Users may also restore a default view if they decide to abandon their changes.

The My Collection list and the Wish List are sortable by the listed fields, and a dropdown box or similar item can let users set the list to display games from one platform. Another similar checkbox is available to "show only online games." The following list of fields are available including, Game Name (clicking on this field takes the user to the gamespace), Platform, Publisher, Developer, Territory/Region, Genre, Release Year, Release Date, GameSpot Review Score (clicking on this field takes the user to the review pages), Reader Review Score (clicking on this field takes the user to a reader review index), User's Personal Review Score (clicking on this field takes the user to user's review, or to a "review it" page if the user hasn't reviewed that game yet), Number of Players, Last Update (refers to the post date and story type of most recent story in gamespace), Online (Y/N), Completed (Y/N), Number of GameSpot Users That Own This Game (clicking on this field takes the user to a list of users, sorted alphabetically, that own this game), and Overall Rank of Game (the higher the number of users claiming to own this game is, the higher its rank).

Additionally, the system automatically tabulates the following measures for each user's collection, including Total Games in Collection, Estimated Value of Collection, Average GameSpot Score of Collection, Average Reader Score of Collection, Average Game Rankings Score of Collection, Preferred Types of Games, Owned Gaming Platforms, Preferred Gaming Platform, Oldest Game Owned, Newest Game Owned, and Last Game Added.

The system can automatically tabulate the following for each user's wish list, including Most Wanted Collection Stats, Total Games in Most Wanted, Estimated Cost of Most Wanted, and Estimated Cost of Most Wanted (with discounts or other special offers).

The system also provides graphically (e.g., bar graph or pie chart, or the like) the following analysis, including Breakdown of games by platform, Breakdown of games by genre, and Breakdown of games by year of release.

Using the Game Collection and Wish Lists, system-wide statistics are available, including stat lists such as Most Owned games (clicking on this name field takes the user to a list of users that own the game), Most Wanted Games (the game with the most wish list appearances leads here—clicking on a name field here takes the user to a list of users that want the game), Largest Collection (shows users with the most games), Most Owned Platform, Most Owned Publisher, Most Valuable Collection (can include retail prices for old and/or foreign games), Most Played Game (highest number of current "Now Playing" appearances wins.

Additionally, the Game Collection and Wish Lists collections enables a Game Collection Image where the system of the present invention enables users to display a digital photo of their game setups and/or game collections by uploading those photos to this space.

Once the statistics are compiled by the system of the present invention, users may communicate with each other, and the system may facilitate communication between users with similar tastes by analyzing the Game Collection and Wish Lists and demographic and behavioral statistics. For example, if two users with public collections have X percentage of games in common (e.g., 50 percent of the smaller collection's games, though the number must be at least 10 games to prevent people from entering one popular game and suddenly being bombarded with every list in the system), the system invites them to look at each others' pages, send each other a nice note, leave feedback on that user, and so on. Whenever one user is looking at other user's collection, games that are in the first user's collection are highlighted. This highlighting feature, combined with the ability to show online games, allows for users to find online games more easily, thereby facilitating two previously unknown users to play together.

My Reader Reviews & FAQs (i.e., My Contributions)

The system can list the games for which the user has reader reviews and/or frequently asked questions (FAQs) posted. The system can also surface reader reviews for an individual user that were not posted. Users can edit their reader reviews, but the re-posted reader reviews will indicate the time when the review was last edited.

Other users can be able to give reader review a "Thumbs Up" if they found the reader's review useful. Reviews with the greatest number of Thumbs Ups can float to the top of a gamespace's reader review list. Users who earn the greatest number of thumbs ups across their reviews receive special privileges as incentive to post reviews. Users may also indicate that they "Trust This Reviewer". The system will automatically notify this user when the "trusted" reviewer posts additional messages or reviews. Also, the "Trusted By # GameSpot Community Members" statistic can appear on the trusted reviewer's Reader Review page.

If a user has posted no reader reviews, he will be invited to write a review for games in his collection. An explanatory paragraph can enlighten users as to what reader reviews are all about and why they're useful.

Game Collection

With regard to the feature above where a user builds a game collection, on the My Games & Preferences page, the system may surface a search box labeled, "Search for Games to Add Them to Your Collection." On Search Results, in addition to a "track it" button, an "I own this game" button can be added to facilitate population of a user's product lists of products that they already own and a user's wish list. These tracking and ownership buttons may also be shown in other features, such as in the review section, where a user reads reviews of various products.

Additionally, users can populate their game collection list by importing lists from other sources. That is, a button labeled "Import Your Game Collection from a Web Page" enables the present invention to query a web page that a user may have previously created for all game titles. Once the game titles are located, acquisition module 152 acquires the game titles and automatically adds those titles to a user's game collection list. The process may include an approval process, which would allow the user to remove any games that were improperly added, and a manual step to permit the user to add games manually.

Any number of sorting and filtering options are provided where the user can manipulate the game collection list. Additionally, a user has the ability to easily rate each game in the collection. The system can tally total number of games, by platform and overall, and also estimate the total value of a user's game collection based on game MSRP (or perhaps, more accurately, based on used game prices).

Game collection statistics are tallied including the Total Games in Collection, Estimated Value of Collection, Average GameSpot Score of Collection, Average Reader Score of Collection, Preferred Genres, Owned Gaming Platforms, Oldest Game Owned, Newest Game Owned, and the like.

The devices and subsystems of the exemplary embodiments of FIGS. 1-6 are for exemplary purposes, as many variations of the specific hardware used to implement the exemplary embodiments are possible, as will be appreciated by those skilled in the relevant arts. For example, the functionality of one or more of the devices and subsystems of the exemplary embodiments of FIGS. 1-6 can be implemented via one or more programmed computer systems or devices.

To implement such variations as well as other variations, a single computer system can be programmed to perform the special purpose functions of one or more of the devices and subsystems of the exemplary embodiments of FIGS. 1-6. On the other hand, two or more programmed computer systems or devices can be substituted for any one of the devices and subsystems of the exemplary embodiments of FIGS. 1-6. Accordingly, principles and advantages of distributed processing, such as redundancy, replication, and the like, also can be implemented, as desired, to increase the robustness and performance of the devices and subsystems of the exemplary embodiments of FIGS. 1-6.

The devices and subsystems of the exemplary embodiments of FIGS. 1-6 can store information relating to various processes described herein. This information can be stored in one or more memories, such as a hard disk, optical disk, magneto-optical disk, RAM, and the like, of the devices and subsystems of the exemplary embodiments of FIGS. 1-6. One or more databases of the devices and subsystems of the exemplary embodiments of FIGS. 1-6 can store the information used to implement the exemplary embodiments of the present invention. The databases can be organized using data structures (e.g., records, tables, arrays, fields, graphs, trees, lists, and the like) included in one or more memories or storage devices listed herein. The processes described with respect to the exemplary embodiments of FIGS. 1-6 can include appropriate data structures for storing data collected and/or generated by the processes of the devices and subsystems of the exemplary embodiments of FIGS. 1-6 in one or more databases thereof.

All or a portion of the devices and subsystems of the exemplary embodiments of FIGS. 1-6 can be conveniently implemented using one or more general purpose computer systems, microprocessors, digital signal processors, microcontrollers, and the like, programmed according to the teachings of the exemplary embodiments of the present invention, as will be appreciated by those skilled in the computer and software arts. Appropriate software can be readily prepared by programmers of ordinary skill based on the teachings of the exemplary embodiments, as will be appreciated by those skilled in the software art. Further, the devices and subsystems of the exemplary embodiments of FIGS. 1-6 can be implemented on the World Wide Web. In addition, the devices and subsystems of the exemplary embodiments of FIGS. 1-6 can be implemented by the preparation of application-specific integrated circuits or by interconnecting an appropriate network of conventional component circuits, as will be appreciated by those skilled in the electrical arts. Thus, the exemplary embodiments are not limited to any specific combination of hardware circuitry and/or software.

As stated above, the devices and subsystems of the exemplary embodiments of FIGS. 1-6 can include computer readable media or memories for holding instructions programmed according to the teachings of the present invention and for holding data structures, tables, records, and/or other data described herein. Computer readable media can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave, or any other suitable medium from which a computer can read.

What is claimed is:

1. A computer-implemented method for product recommendation, the method comprising:
    by at least one computer system,
        determining a similarity percentage between a first list of products and each of a plurality of a second list of products, wherein each product that appears on at least one second list and does not appear on the first list is a candidate product;
        for each candidate product,
            determining the sum, across the second lists, of each instance of the candidate product weighted by the determined similarity percentage for the second list upon which the instance of the candidate product appears; and
        recommending candidate products in order of determined sum of the candidate product.

2. The method of claim 1, wherein:
    the similarity percentage between a first list and each second list is the percentage of first list products that appear on the second list.

3. The method of claim 1, wherein:
    each of the first list and the second lists is characterized by the same categorization.

4. The method of claim 1, further comprising, prior to determining a similarity percentage:
    acquire the first list.

5. The method of claim 4, wherein acquiring the first list comprises:
    scan an electronic device associated with a first user for the first list.

6. The method of claim 5, wherein acquiring the first list comprises:
    scanning an electronic device associated with a first user for the products to be listed.

7. The method of claim 1, wherein:
    recommending comprises displaying the list of recommended products to a user.

8. A computer program product for product recommendation, the computer program product comprising:
    non-transmission media memory; and
    instructions, stored on the non-transmission media memory, that when executed by at least one processor:
        determine a similarity percentage between a first list of products and each of a plurality of a second list of products, wherein each product that appears on at least one second list and does not appear on the first list is a candidate product;
        for each candidate product,
            determine the sum, across the second lists, of each instance of the candidate product weighted by the determined similarity percentage for the second list upon which the instance of the candidate product appears; and
        recommend candidate products in order of determined sum of the candidate product.

9. The computer program product of claim 8, wherein:
    the similarity percentage between the first list and each second list is the percentage of first list products that appear on the second list.

10. The computer program product of claim 8, wherein:
    each of the first list and the second lists is characterized by the same categorization.

11. The computer program product of claim 8, further comprising, prior to determining a similarity percentage:
    acquire the first list.

12. The computer program product of claim 11, wherein acquiring the first list comprises:
    scan an electronic device associated with a first user for the first list.

13. The computer program product of claim 12, wherein acquiring the first list comprises:
    scanning an electronic device associated with a first user for the products to be listed.

14. The computer program product of claim 8, wherein:
recommending comprises displaying the list of recommended products to a user.

15. A system for product recommendation, the system comprising:
at least one processor; and
instructions that when executed by the at least one processor:
determine a similarity percentage between a first list of products and each of a plurality of a second list of products, wherein each product that appears on at least one second list and does not appear on the first list is a candidate product;
for each candidate product,
determine the sum, across the second lists, of each instance of the candidate product weighted by the determined similarity percentage for the second list upon which the instance of the candidate product appears; and
recommend candidate products in order of determined sum of the candidate product.

16. The system of claim 15, wherein:
the similarity percentage between the first list and each second list is the percentage of first list products that appear on the second list.

17. The system of claim 15, wherein:
each of the first list and the second lists is characterized by the same categorization.

18. The system of claim 15, further comprising, prior to determining a similarity percentage:
acquire the first list.

19. The system of claim 18, wherein acquiring the first list comprises:
scan an electronic device associated with a first user for the first list.

20. The system of claim 19, wherein acquiring the first list comprises:
scanning an electronic device associated with a first user for the products to be listed.

21. The system of claim 15, wherein:
recommending comprises displaying the list of recommended products to a user.

22. A computer-implemented method for product recommendation, the method comprising:
by at least one computer system,
determining a similarity percentage between a first set of products and each of a plurality of a second set of products, wherein each product in the at least one second set and not in the first set is a candidate product;
for each candidate product,
determining the sum, across the second sets, of each instance of the candidate product weighted by the determined similarity percentage for the second set in which the instance of the candidate product appears; and
recommending candidate products in order of determined sum of the candidate product.

* * * * *